US012592624B2

(12) United States Patent　　　　　(10) Patent No.:　US 12,592,624 B2
Takahashi et al.　　　　　　　　　　(45) Date of Patent:　　Mar. 31, 2026

(54) VIBRATION ACTUATOR WITH MOVABLE BODY AND FIXING BODY HAVING MAGNETIC CYLINDRICAL BODY OUTSIDE COIL WITH LENGTH

(71) Applicants: Yuki Takahashi, Tokyo (JP); Chikara Sekiguchi, Tokyo (JP); Shigeyuki Shimomura, Tokyo (JP); Daisuke Kodama, Tokyo (JP); Yuta Yoshii, Tokyo (JP); Yasutaka Kitamura, Tokyo (JP); Shigenori Inamoto, Tokyo (JP)

(72) Inventors: Yuki Takahashi, Tokyo (JP); Chikara Sekiguchi, Tokyo (JP); Shigeyuki Shimomura, Tokyo (JP); Daisuke Kodama, Tokyo (JP); Yuta Yoshii, Tokyo (JP); Yasutaka Kitamura, Tokyo (JP); Shigenori Inamoto, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 0 days.

(21) Appl. No.: 18/648,526

(22) Filed: Apr. 29, 2024

(65) Prior Publication Data

US 2024/0275249 A1　　Aug. 15, 2024

Related U.S. Application Data

(63) Continuation of application No. 17/561,956, filed on Dec. 26, 2021, now Pat. No. 12,003,156, which is a
(Continued)

(30) Foreign Application Priority Data

Aug. 28, 2018　(JP) ................................. 2018-159790

(51) Int. Cl.
*H02K 33/00*　　(2006.01)
*H02K 33/06*　　(2006.01)

(52) U.S. Cl.
CPC ................................... *H02K 33/06* (2013.01)

(58) Field of Classification Search
CPC ...... H02K 35/00; H02K 35/02; H02K 11/046; H02K 7/1869; H02K 7/1876; H02K 41/02;
(Continued)

(56) References Cited

U.S. PATENT DOCUMENTS 4,358,691 A　11/1982　Naylor
4,412,317 A　10/1983　Asjes et al.
(Continued)

FOREIGN PATENT DOCUMENTS

CN　　101944819　　　1/2011
DE　　202018000352　　2/2019
(Continued)

OTHER PUBLICATIONS

International Search Report and the Written Opinion Dated Nov. 19, 2019 From the International Searching Authority Re. Application No. PCT/JP2019/033638 and Its Translation of Search Report Into English. (11 Pages).
(Continued)

*Primary Examiner* — Maged M Almawri

(57)　　　　　　　ABSTRACT

A vibration actuator includes: a movable body which includes a stack formed by a magnet, a pair of magnetic cores and a pair of non-magnetic weights, is supported at both upper and lower sides of the movable body by a pair of leaf springs made of a magnetic material connected respectively to the pair of non-magnetic weights, and is operable to move vertically inside of a coil of a fixing body. The fixing body further includes a magnetic cylindrical body which is
(Continued)

disposed outside of the coil, and has a length, the length being longer than a distance between upper and lower ends of the pair of magnetic cores and shorter than a distance between the pair of leaf springs.

4 Claims, 14 Drawing Sheets

Related U.S. Application Data continuation of application No. 17/271,614, filed as application No. PCT/JP2019/033638 on Aug. 28, 2019, now Pat. No. 11,848,586.

(58) Field of Classification Search
CPC ........ H02K 33/00; H02K 33/02; H02K 33/04; H02K 33/06; H02J 1/00; H02N 11/00; H02N 11/002; H02N 11/04
USPC ....... 310/29, 12, 12.12, 12.01, 12.03, 12.13, 310/12.16, 12.26, 25, 15
See application file for complete search history.

(56) References Cited

U.S. PATENT DOCUMENTS

| | | | |
|---|---|---|---|
| 5,682,132 A | 10/1997 | Hiroyoshi et al. | |
| 5,896,076 A | 4/1999 | Van Namen | |
| 5,973,422 A | 10/1999 | Clamme | |
| 6,501,357 B2 | 12/2002 | Petro | |
| 6,505,718 B2 | 1/2003 | Fujita et al. | |
| 6,983,923 B2 | 1/2006 | Fukui et al. | |
| 7,078,832 B2 * | 7/2006 | Inagaki | H02K 7/14 335/238 |
| 7,449,803 B2 * | 11/2008 | Sahyoun | H02K 33/16 310/23 |
| 7,586,220 B2 * | 9/2009 | Roberts | H02K 1/34 290/1 R |
| 7,671,493 B2 | 3/2010 | Takashima et al. | |
| 7,791,456 B2 * | 9/2010 | Miura | H02K 33/16 340/407.1 |
| 7,911,098 B2 | 3/2011 | Lee et al. | |
| 7,948,124 B1 | 5/2011 | Waters et al. | |
| 8,013,480 B2 * | 9/2011 | Bang | B06B 1/045 310/12.33 |
| 8,097,991 B2 * | 1/2012 | Masami | H02K 33/16 310/15 |
| 8,188,623 B2 | 5/2012 | Park et al. | |
| 8,278,786 B2 * | 10/2012 | Woo | H02K 33/16 310/15 |
| 8,288,899 B2 * | 10/2012 | Park | H02K 33/16 310/71 |
| 8,456,032 B2 | 6/2013 | Hochberg et al. | |
| 8,492,937 B2 * | 7/2013 | Roberts | H02K 35/00 310/32 |
| 8,575,794 B2 * | 11/2013 | Lee | H02K 33/18 310/15 |
| 8,593,017 B2 | 11/2013 | Stefanini et al. | |
| 8,629,569 B2 * | 1/2014 | Roberts | H02K 35/02 290/1 R |
| 8,736,086 B2 | 5/2014 | Yang | |
| 9,461,530 B2 * | 10/2016 | Wasenczuk | H02K 35/02 |
| 9,695,806 B2 | 7/2017 | Van Brunt et al. | |
| 9,815,085 B2 * | 11/2017 | Chun | G06F 3/016 |
| 9,906,109 B2 * | 2/2018 | Endo | H02K 33/16 |
| 10,079,531 B2 | 9/2018 | Xu et al. | |
| 10,307,791 B2 | 6/2019 | Xu et al. | |
| 10,328,461 B2 | 6/2019 | Xu et al. | |
| 10,486,196 B2 | 11/2019 | Chai et al. | |
| 10,622,538 B2 | 4/2020 | Zhang et al. | |
| 10,630,142 B2 * | 4/2020 | Kanaya | H02K 33/02 |
| 10,710,115 B2 | 7/2020 | Huang et al. | |
| 10,848,044 B1 * | 11/2020 | Miesner | H02K 33/06 |
| 10,855,156 B2 | 12/2020 | Matsuyama et al. | |
| 11,031,857 B2 | 6/2021 | Wasenczuk | |
| 11,152,843 B2 | 10/2021 | Wasenczuk | |
| 11,418,099 B2 | 8/2022 | Takahashi et al. | |
| 11,632,030 B2 * | 4/2023 | Wasenczuk | H02K 1/34 310/12.12 |
| 11,973,389 B2 * | 4/2024 | Neubauer | H02K 33/16 |
| 2004/0104625 A1 * | 6/2004 | Wakuda | B06B 1/0215 310/23 |
| 2004/0119343 A1 * | 6/2004 | Ueda | G10K 9/22 310/12.31 |
| 2005/0225181 A1 | 10/2005 | Tu et al. | |
| 2005/0285454 A1 | 12/2005 | Choi et al. | |
| 2006/0002577 A1 * | 1/2006 | Won | B06B 1/045 381/396 |
| 2007/0052302 A1 | 3/2007 | Cheung et al. | |
| 2007/0085425 A1 * | 4/2007 | Hirashima | H02K 33/16 310/15 |
| 2007/0182257 A1 * | 8/2007 | Miura | H04R 9/02 310/23 |
| 2008/0265692 A1 * | 10/2008 | Roberts | H02K 1/34 310/15 |
| 2009/0250032 A1 | 10/2009 | Fullerton et al. | |
| 2009/0320219 A1 * | 12/2009 | Takahashi | H02K 33/16 15/21.1 |
| 2010/0066182 A1 | 3/2010 | Yamazaki et al. | |
| 2010/0327672 A1 | 12/2010 | Roberts | |
| 2011/0018364 A1 * | 1/2011 | Kim | H02K 33/18 310/20 |
| 2011/0018365 A1 * | 1/2011 | Kim | B06B 1/045 310/20 |
| 2011/0062803 A1 * | 3/2011 | Lee | H02K 33/18 310/29 |
| 2011/0068640 A1 * | 3/2011 | Choi | H02K 5/04 310/25 |
| 2011/0089773 A1 * | 4/2011 | Choi | H02K 33/16 310/25 |
| 2011/0133577 A1 * | 6/2011 | Lee | H02K 33/18 310/15 |
| 2011/0193426 A1 * | 8/2011 | Chung | H02K 33/16 310/25 |
| 2011/0193427 A1 | 8/2011 | Lemieux | |
| 2011/0198948 A1 * | 8/2011 | Keisuke | H02K 5/225 310/25 |
| 2011/0198949 A1 * | 8/2011 | Furuich | H02K 33/16 310/25 |
| 2011/0254385 A1 | 10/2011 | Makino et al. | |
| 2011/0260559 A1 | 10/2011 | Kanai | |
| 2011/0291497 A1 * | 12/2011 | Choi | H02K 33/18 310/25 |
| 2012/0032535 A1 * | 2/2012 | Park | H02K 35/02 310/25 |
| 2012/0098380 A1 | 4/2012 | Wang et al. | |
| 2012/0146557 A1 * | 6/2012 | Pyo | H02K 33/18 310/25 |
| 2012/0169148 A1 | 7/2012 | Kim et al. | |
| 2012/0212097 A1 * | 8/2012 | Wasenczuk | B06B 1/04 310/216.001 |
| 2012/0293022 A1 * | 11/2012 | Park | B06B 1/045 310/25 |
| 2013/0033128 A1 * | 2/2013 | Yoon | H02K 33/18 310/25 |
| 2013/0033129 A1 * | 2/2013 | Hong | B06B 1/045 310/25 |
| 2013/0043766 A1 * | 2/2013 | Takahashi | H04R 17/00 310/326 |
| 2013/0088100 A1 | 4/2013 | Lee et al. | |
| 2013/0099600 A1 * | 4/2013 | Park | B06B 1/045 310/15 |
| 2013/0154403 A1 | 6/2013 | Hong et al. | |
| 2013/0285479 A1 * | 10/2013 | Kinoshita | H02K 35/02 310/12.12 |
| 2014/0062225 A1 * | 3/2014 | Kim | H02K 33/00 310/15 |
| 2014/0103751 A1 * | 4/2014 | Furukawa | H02K 35/02 310/25 |
| 2014/0132089 A1 | 5/2014 | Jeon | |

(56) References Cited

U.S. PATENT DOCUMENTS

| | | | |
|---|---|---|---|
| 2014/0265651 A1* | 9/2014 | Kim | H02K 33/16 |
| | | | 310/25 |
| 2014/0346901 A1 | 11/2014 | Hayward et al. | |
| 2015/0194870 A1 | 7/2015 | Kim et al. | |
| 2016/0094115 A1 | 3/2016 | Okawa et al. | |
| 2016/0126821 A1* | 5/2016 | Iwaki | H02K 7/08 |
| | | | 310/12.21 |
| 2016/0149517 A1* | 5/2016 | Choi | H02N 1/04 |
| | | | 427/58 |
| 2016/0149518 A1 | 5/2016 | Wang et al. | |
| 2016/0190903 A1 | 6/2016 | Ohishi et al. | |
| 2017/0033653 A1 | 2/2017 | Wang et al. | |
| 2017/0033673 A1 | 2/2017 | Wang et al. | |
| 2017/0110952 A1 | 4/2017 | Takeda et al. | |
| 2017/0141665 A1 | 5/2017 | Genderjahn et al. | |
| 2017/0288523 A1 | 10/2017 | Katada et al. | |
| 2017/0328441 A1 | 11/2017 | Kanaya et al. | |
| 2017/0346376 A1 | 11/2017 | Kim et al. | |
| 2017/0366077 A1 | 12/2017 | Oonishi et al. | |
| 2018/0026514 A1 | 1/2018 | Mao et al. | |
| 2018/0059793 A1 | 3/2018 | Hajati | |
| 2018/0297074 A1 | 10/2018 | Husng et al. | |
| 2019/0207496 A1 | 7/2019 | Takahashi et al. | |
| 2019/0267882 A1 | 8/2019 | Matsuyama et al. | |
| 2019/0296627 A1 | 9/2019 | Takahashi et al. | |
| 2019/0386552 A1 | 12/2019 | Takahashi et al. | |
| 2020/0274432 A1 | 8/2020 | Wauke | |
| 2021/0028679 A1 | 1/2021 | Wasenczuk | |
| 2021/0328491 A1* | 10/2021 | Takahashi | B06B 1/045 |
| 2022/0123639 A1 | 4/2022 | Takahashi et al. | |
| 2022/0123640 A1 | 4/2022 | Takahashi et al. | |
| 2022/0123641 A1 | 4/2022 | Takahashi et al. | |
| 2022/0123642 A1 | 4/2022 | Takahashi et al. | |
| 2023/0074890 A1 | 3/2023 | Muniraju et al. | |

FOREIGN PATENT DOCUMENTS

| | | |
|---|---|---|
| JP | 54-95818 | 7/1979 |
| JP | 58-031779 | 3/1983 |
| JP | 59-191427 | 12/1984 |
| JP | 09-117721 | 5/1997 |
| JP | 11-262234 | 9/1999 |
| JP | 2000-023440 | 1/2000 |
| JP | 2002-521185 | 7/2002 |
| JP | 2002-307012 | 10/2002 |
| JP | 2004-140902 | 5/2004 |
| JP | 2004-181304 | 7/2004 |
| JP | 2004-293334 | 10/2004 |
| JP | 3748637 | 12/2005 |
| JP | 2006-296127 | 10/2006 |
| JP | 2009-033864 | 2/2009 |
| JP | 4255124 | 4/2009 |
| JP | 2010-011604 | 1/2010 |
| JP | 2012-151954 | 8/2012 |
| JP | 2013-126299 | 6/2013 |
| JP | 2015-502737 | 1/2015 |
| JP | 2016-013554 | 1/2016 |
| WO | WO 2011/102451 | 8/2011 |
| WO | WO 2020/045470 | 3/2020 |

OTHER PUBLICATIONS

Interview Summary Dated Oct. 18, 2023 from the US Patent and Trademark Office Re. U.S. Appl. No. 17/561,956. (3 pages).

Notice of Allowance Dated Aug. 10, 2022 together with Interview Summary Dated Jul. 29, 2022 from US Patent and Trademark Office Re. U.S. Appl. No. 17/561,955. (42 pages).

Notice of Allowance Dated Aug. 14, 2023 from US Patent and Trademark Office Re. U.S. Appl. No. 17/271,614. (18 pages).

Notice of Allowance Dated Apr. 25, 2022 from US Patent and Trademark Office Re. U.S. Appl. No. 17/561,953. (21 pages).

Notice of Allowance Dated Apr. 28, 2022 from US Patent and Trademark Office Re. U.S. Appl. No. 17/561,954. (21 pages).

Notice of Allowance Dated Jan. 31, 2024 together with Interview Summary Dated Jan. 27, 2024 from the US Patent and Trademark Office Re. U.S. Appl. No. 17/561,956. (9 pages).

Office Action Dated Apr. 12, 2023 from the US Patent and Trademark Office Re. U.S. Appl. No. 17/561,956. (34 pages).

Official Action Dated Oct. 23, 2023 together with Interview Summary from the US Patent and Trademark Office Re. U.S. Appl. No. 17/561,956. (20 pages).

Official Action Dated Apr. 24, 2023 from the US Patent and Trademark Office Re. U.S. Appl. No. 17/271,614. (31 pages).

Supplementary European Search Report and the European Search Opinion Dated Apr. 7, 2022 From the European Patent Office Re. Application No. 19854445.4. (11 Pages).

LibreTexts "Applications of Second Order Differential Equations", Mathematics LibreTexts, 17.3 (21 pages).

European Search Report and the European Search Opinion Dated Oct. 7, 2025 From the European Patent Ofice Re. Application No. 25198731.9. (13 Pages).

Notice of Reasons for Refusal Dated Sep. 9, 2025 From the Japan Patent Office Re. Application No. 2024-118818 and Its Translation Into English. (18 Pages).

Decision of Refusal Dated Feb. 24, 2026 From the Japan Patent Office Re. Application No. 2024-118818 and Its Translation Into English. (14 Pages).

* cited by examiner

10

81

81

10A

VIBRATION ACTUATOR WITH MOVABLE BODY AND FIXING BODY HAVING MAGNETIC CYLINDRICAL BODY OUTSIDE COIL WITH LENGTH

CROSS REFERENCE TO RELATED APPLICATIONS

This application is a Continuation of U.S. patent application Ser. No. 17/561,956 filed on Dec. 26, 2021, which is a Continuation of U.S. patent application Ser. No. 17/271, 614, filed on Feb. 26, 2021, now U.S. Pat. No. 11,848,586, which is a National Phase of PCT Patent Application No. PCT/JP2019/033638 having International Filing Date of Aug. 28, 2019, which claims the benefit of priority of Japanese Patent Application No. 2018-159790 filed on Aug. 28, 2018. The contents of the above applications are all incorporated by reference as if fully set forth herein in their entirety.

TECHNICAL FIELD

The present invention relates to a vibration actuator and an electronic apparatus including the same.

BACKGROUND ART

Conventional electronic devices with a vibration function have vibration actuators implemented as a source of vibration generation. By driving the vibration actuator and transmitting vibration to the user, the electronic device can notify the user of incoming calls and improve the sense of operation and presence. Here, electronic devices include portable game terminals, controllers (game pads) for stationary game machines, portable communication terminals such as cell phones and smartphones, portable information terminals such as tablet PCs, and portable devices that can be carried by wearable terminals worn on clothes or arms.

As for vibration actuators with a structure that can be miniaturized to be mounted on portable devices, for example, vibration actuators used in pagers and the like are known as disclosed in PTL 1.

In this vibration actuator, a pair of plate-like elastic bodies are made to face each other and each is supported at the opening edge of a cylindrical frame. Then, a yoke with a magnet attached is fixed to the raised central portion in one of the spiral-shaped plate elastic bodies of the pair of plate elastic bodies, and the yoke is supported in the frame. The yoke constitutes a magnetic field generator together with the magnet, and a coil is placed in the magnetic field of this magnetic field generator with the coil attached to the other plate shaped elastic body. The pair of plate elastic bodies are selectively resonated and vibrate by switching the current of different frequencies to this coil through an oscillation circuit, and the yoke vibrates in the frame in the direction of the centerline of the frame.

In this vibration actuator, the distance between the magnet and the coil and between the yoke and the coil is larger than the distance between the yoke and the inner wall of the frame. This prevents the yoke and magnet from coming into contact with the coil and prevents the coil from being damaged by having the yoke collide with the inner peripheral wall of the frame first when it receives an external shock.

However, in practice, since the yoke with the magnet collides with the frame body, the pair of plate elastic bodies that elastically support the movable body with the yoke may be damaged by the impact.

For this reason, PTL 1 discloses, as a second embodiment, a configuration in which a fixing body is provided with a shaft on which the movable body slides and moves in the direction of vibration. As a result, the yoke, which is a movable body, does not move to the inner surface of the frame by the shaft even if it receives an external shock, preventing it from colliding with the frame.

CITATION LIST

Patent Literature

PTL 1
Japanese Patent Publication No. 3748637

SUMMARY OF INVENTION

Technical Problem

However, in the conventional configuration of a vibration actuator in which a shaft on which a movable body slides is provided in a fixing body, although the shaft can regulate the movement of the movable body and improve shock resistance, the movable body slides on the shaft during driving, which may cause sliding noise.

The generation of noise due to contact, such as vibration noise, disadvantageously reduces the amplitude of the vibration actuator itself. Therefore, it is desired that the vibration actuator, which vibrates as a vibrating body by driving a movable body, should be able to output vibration with high amplitude without vibration noise, and transmit it to the user so that the user can fully experience the vibration, that is, output suitable vibration.

An object of the present invention is to provide a vibration actuator and an electronic apparatus that generate suitable vibration with high output while achieving impact resistance.

Solution to Problem

A vibration actuator according to an embodiment of the present invention includes a fixing body including a coil; a movable body including a magnet disposed inside the coil in a radial direction such that the magnet is relatively movable in a vibration direction orthogonal to the radial direction, the movable body being configured to vibrate with respect to the fixing body by cooperation of the magnet and the coil to which power is fed; and an elastic support part configured to movably support the movable body with respect to the fixing body, wherein the fixing body includes a coil holding part disposed to surround the movable body and configured to hold the coil, wherein the coil holding part includes a coil protection wall part disposed on an inner diameter side of the coil with a space between the coil protection wall part and the magnet, the coil protection wall part being configured to prevent the magnet and the coil from making contact with each other, wherein the elastic support part includes at least two or more leaf springs provided across the coil holding part and the movable body to sandwich the movable body in the vibration direction, and wherein the leaf springs support the movable body such that the movable body is movable in the vibration direction without making contact with the coil holding part in a non-vibration state and a vibration state of the movable body.

An electronic apparatus according to an embodiment of the present invention includes the vibration actuator having the above-mentioned configuration.

According to the present invention, it is possible to generate suitable vibration with high output while achieving impact resistance.

DESCRIPTION OF EMBODIMENTS

Embodiments of the present invention will be elaborated below with reference to the accompanying drawings.

Embodiment 1

Overall Configuration of Vibration Actuator

Figure 1:
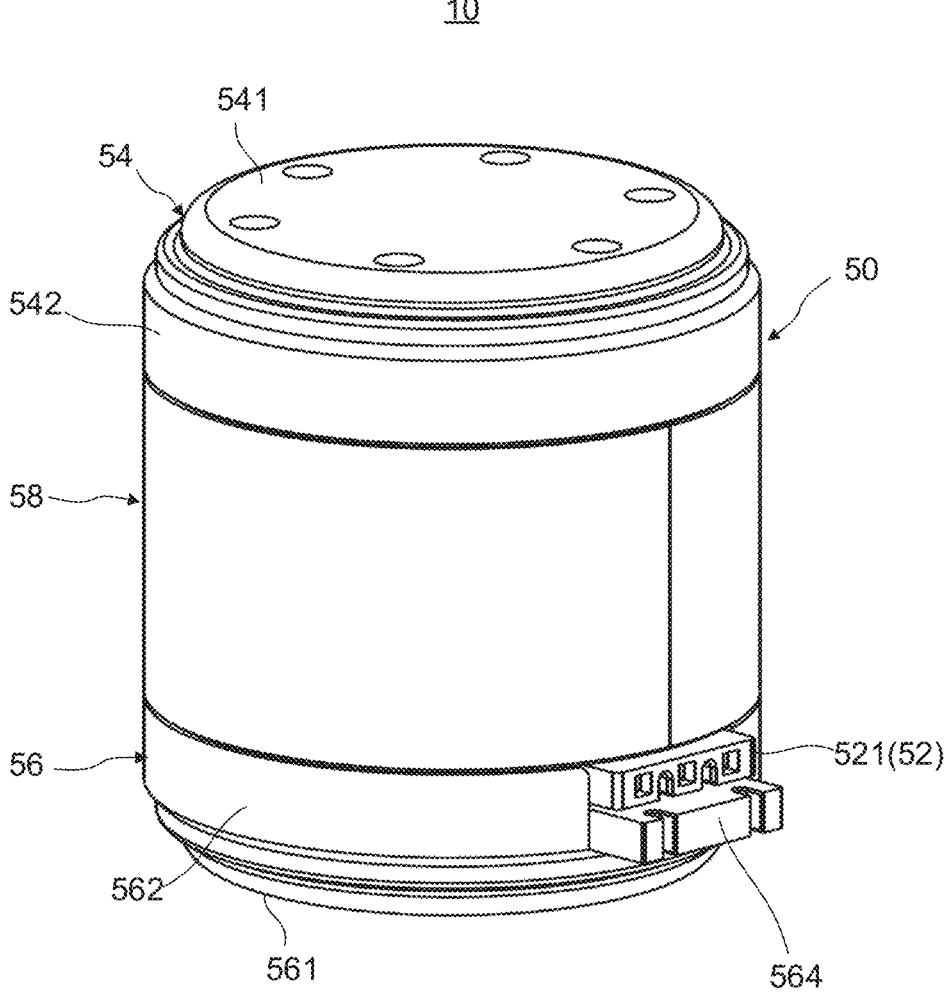
FIG. 1 is a perspective view illustrating an external appearance of a vibration actuator according to Embodiment 1 of the present invention.
Figure 2:
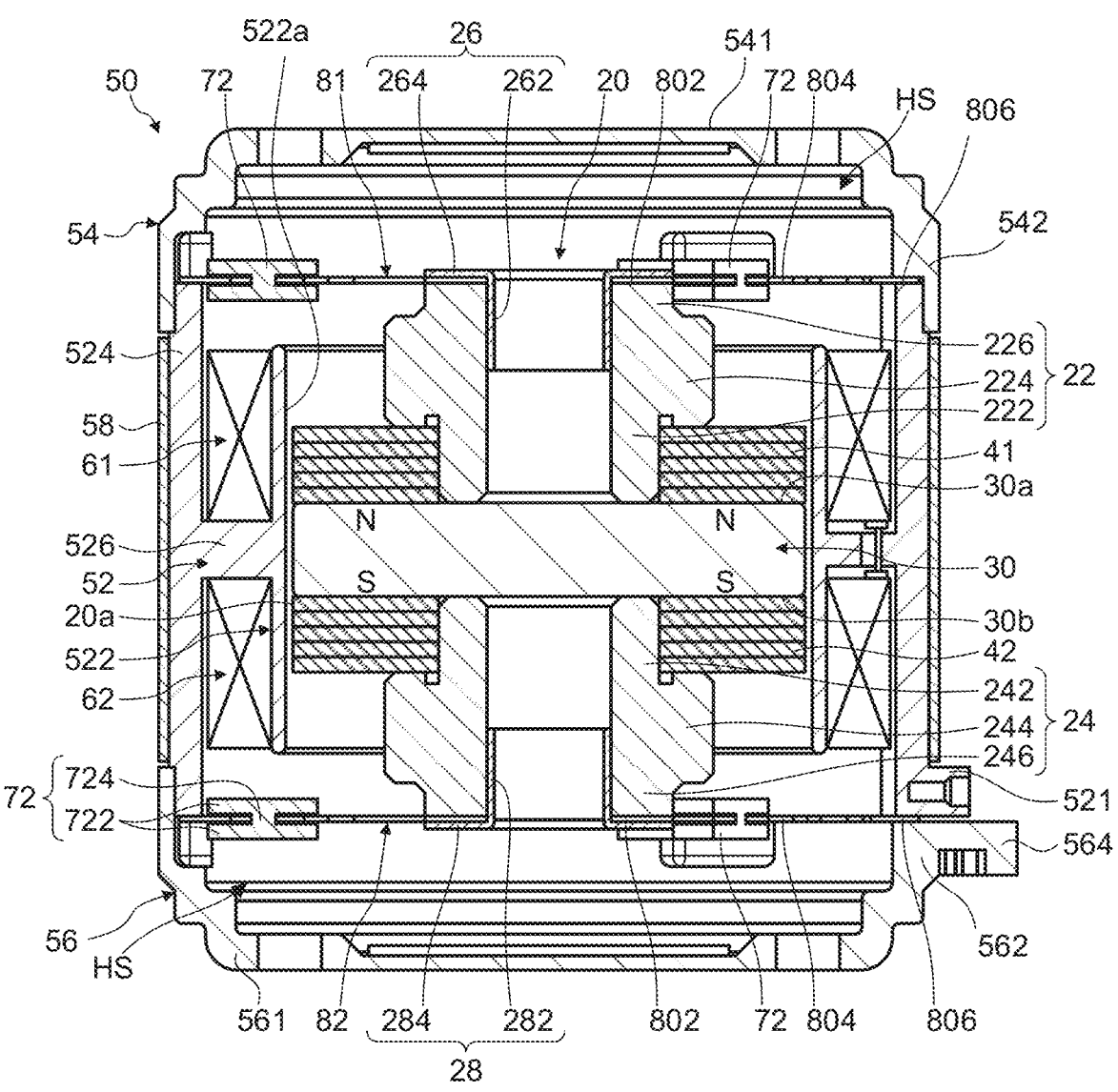
FIG. 2 is a longitudinal sectional view illustrating a vibration actuator according to Embodiment 1 of the present invention.
Figure 3:
FIG. 3 is an exploded perspective view of the vibration actuator.
Figure 3:
Figure 4:
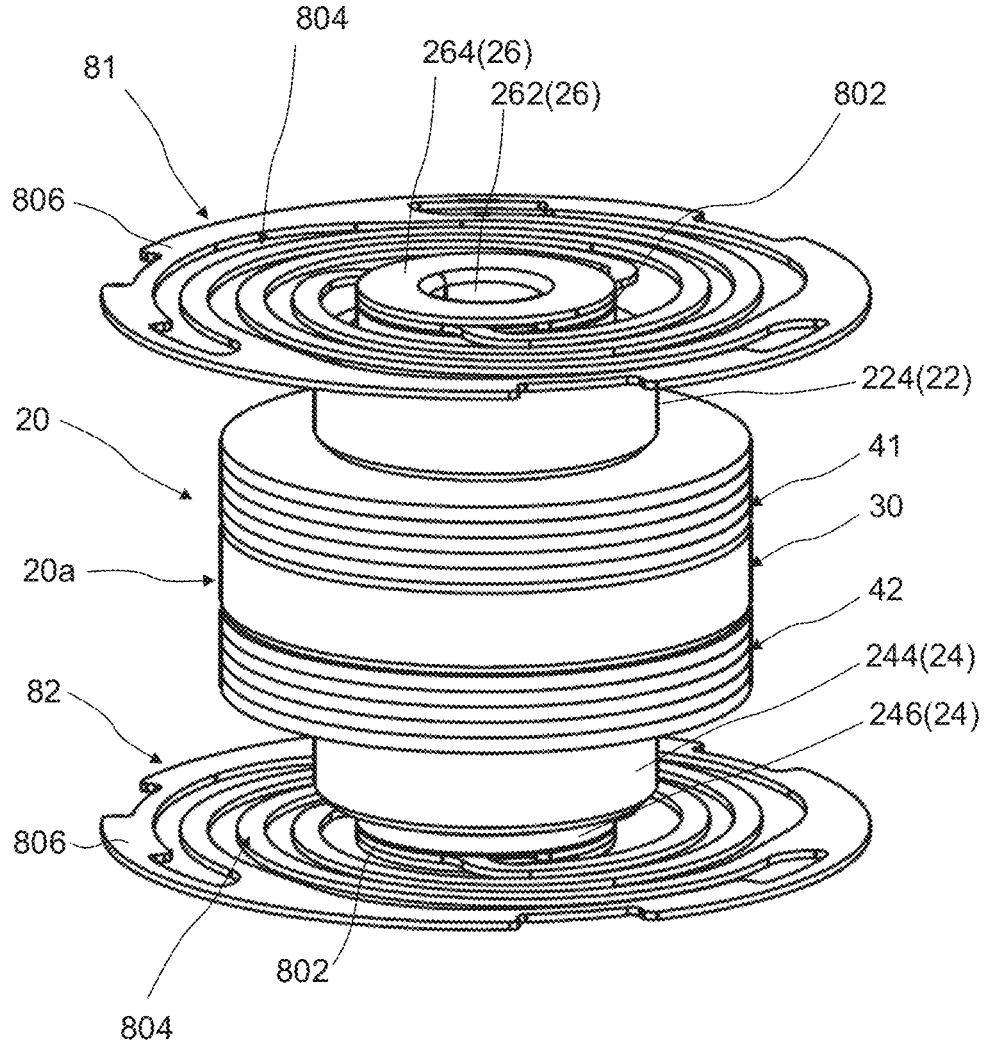
FIG. 4 is a perspective view illustrating a movable body and an elastic support part of the vibration actuator.

FIG. 1 is a perspective view illustrating an external appearance of a vibration actuator according to Embodiment 1 of the present invention, FIG. 2 is a longitudinal sectional view illustrating a vibration actuator according to Embodiment 1 of the present invention, and FIG. 3 is an exploded perspective view of the vibration actuator. In addition, FIG. 4 is a perspective view illustrating a movable body and an elastic support part of the vibration actuator. It is to be noted that in the present embodiment the "upper" side and the "lower" side are used for the sake of convenience of description, and mean one side and the other side in the vibration direction of movable body 20 in vibration actuator 10. That is, when vibration actuator 10 is mounted in an electronic apparatus (see FIG. 16 and FIG. 17), the upper side and the lower side may be reversed, or may be set to the left side and the right side.

Vibration actuator 10 illustrated in FIG. 1 to FIG. 4 is mounted as a vibration generation source in an electronic apparatus, or in other words, a mobile game terminal (for example, game controller GC illustrated in FIG. 16), or a mobile apparatus such as a smartphone (for example, mobile terminal M illustrated in FIG. 17), and implements the vibration function of each apparatus. In addition, vibration actuator 10 may have a function of generating a sound using vibration. Vibration actuator 10 is driven when notifying incoming calls to the user, or when giving a sense of control and realism to the user, for example.

As illustrated in FIG. 1, in vibration actuator 10 of the present embodiment, movable body 20 (see FIG. 2) is housed in columnar fixing body 50 such that it can be vibrated in the axis direction of the column, and vibration actuator 10 itself serves as a vibrating member when movable body 20 moves.

As illustrated in FIG. 2 to FIG. 4, vibration actuator 10 includes movable body 20 including magnet 30 and movable body cores 41 and 42, fixing body 50 including coils 61 and 62, and plate-shaped elastic support parts 81 and 82 that reciprocally support movable body 20 with respect to fixing body 50.

In vibration actuator 10, coils 61 and 62, magnet 30 and movable body cores 41 and 42 constitute a magnetic circuit that vibrates movable body 20. In vibration actuator 10, when coils 61 and 62 are energized by power supplied by a power supply part (for example, drive control unit 203 illustrated in FIG. 16 and FIG. 17), coils 61 and 62 and magnet 30 operate in conjunction with each other, and movable body 20 reciprocates in the vibration direction with respect to fixing body 50.

In vibration actuator 10 of the present embodiment, movable body 20 inside coils 61 and 62 held by coil holding part 52 reciprocates in the axis direction of coils 61 and 62, that is, the vibration direction. To be more specific, movable body 20 can reciprocate inside inner body part (coil protection wall part) 522 disposed between coils 61 and 62 and movable body 20. Inner body part 522 is a part of coil holding part 52, and details of coil holding part 52 will be described later. In addition, the axis direction of coils 61 and 62 is the vibration direction of movable body 20, and the magnetization direction of magnet 30 or the axis direction of coil holding part 52.

In vibration actuator 10, movable body 20 in the non-vibration state where it is not movable is disposed inside fixing body 50 (to be more specific, inner body part 522 of coil holding part 52) with a predetermined distance therebetween through elastic support parts 81 and 82 at the center of the length in the vibration direction of fixing body 50 (to be more specific, coil holding part 52), and, in the direction orthogonal to the axis direction of movable body 20. Here, movable body 20 is desirably located at a balanced position between coils 61 and 62 so as not to make contact with inner body part 522 of coil holding part 52. To be more specific, preferably, the center of the length of magnet 30 and movable body cores 41 and 42 in the vibration direction is opposite to the center of the length between coils 61 and 62 in the vibration direction in the direction orthogonal to the vibration direction.

In the movable state (vibration state), movable body 20 reciprocates in the vibration direction along inner peripheral surface 522a of inner body part 522. It is to be noted that a magnetic fluid may be interposed between inner body part 522 and movable body 20.

Movable Body 20

As illustrated in FIG. 2 to FIG. 4, inside cylindrical coil holding part 52 of fixing body 50, movable body 20 is supported by elastic support parts 81 and 82 such that movable body 20 can reciprocate along inner peripheral surface 522a of inner body part 522. This reciprocation direction is the direction in which the case (hereinafter referred to as "upper case") 54 and the case (hereinafter referred to as "lower case") 56 for closing the opening of coil holding part 52 are opposite to each other.

Movable body 20 includes magnet 30, movable body cores 41 and 42, and spring stoppers 22 and 24. In the present embodiment, from magnet 30 at the center, movable body cores 41 and 42 and spring stoppers 22 and 24 are continuously provided in the vibration direction. At movable body 20, outer peripheral surface 20a of magnet 30 and movable body cores 41 and 42 is disposed inside inner peripheral surface 522a of inner body part 522 with a predetermined distance therebetween.

When movable body 20 moves in the vibration direction, outer peripheral surface 20a reciprocates along inner peripheral surface 522a without making contact therewith.

Radially inside coils 61 and 62, magnet 30 is disposed such that magnet 30 can relatively move in the vibration direction orthogonal to the radial direction of coils 61 and 62. Radially inside coils 61 and 62, magnet 30 is disposed with a distance from coils 61 and 62. Here, the "radial direction" is a direction orthogonal to the axis of coils 61 and 62 and is a direction orthogonal to the vibration direction. The "distance" in the radial direction is a distance between coils 61 and 62 and magnet 30 including inner body part 522, and a distance with which movement can be made with no contact therebetween in the vibration direction of movable body 20. In the present embodiment, the distance between coils 61 and 62 and magnet 30 means the distance between the inner body part 522 on coils 61 and 62 side and magnet 30.

In addition, in the present embodiment, magnet 30 is disposed opposite to the center of inner body part 522 outside the radial direction of magnet 30. It is to be noted that as long as magnet 30 is disposed inside the coils 61 and 62 such that two magnetization surfaces face the extending direction of the axis of coils 61 and 62, magnet 30 may have a shape other than a disk shape such as a cylindrical shape and a plate shape.

In the present embodiment, magnet 30 is a magnet having a disk shape whose axis direction is the vibration direction and the magnetization direction. Desirably, the center of magnet 30 in the axis direction coincides with the center of movable body 20 in the axis direction.

Magnet 30 is magnetized in the vibration direction, and front and rear surfaces 30a and 30b separated in the vibration direction have different polarities.

Movable body cores 41 and 42 are provided at front and rear surfaces 30a and 30b of magnet 30, respectively.

Movable body cores 41 and 42 are magnetic substances, and constitute a magnetic circuit together with magnet 30 and coils 61 and 62 to function as a yoke. Movable body cores 41 and 42 focus and efficiently transmit the magnetic flux of magnet 30 without causing leakage so as to effectively distribute the magnetic flux flowing between magnet 30 and coils 61 and 62.

In addition, in addition to the function of a part of the magnetic circuit, movable body cores 41 and 42 have a function as the body of movable body 20 and a function as a weight, in movable body 20.

In the present embodiment, movable body cores 41 and 42 are formed in an annular plate shape and disposed such that the outer peripheral surface is flush with the outer peripheral surface of magnet 30 so as to constitute outer peripheral surface 20a of movable body 20 together with the outer peripheral surface of magnet 30.

Movable body cores 41 and 42 are lamination cores and are formed by stacking silicon steel sheets, for example. In the present embodiment, movable body cores 41 and 42 are formed in the same manner, and are symmetric about magnet 30. It is to be noted that movable body cores 41 and 42 are attracted by magnet 30 and fixed to magnet 30 with a heat curable adhesive agent such as epoxy resin or an anaerobic adhesive agent, for example.

Openings 412 and 422 formed at center portions of movable body cores 41 and 42 indicate the axis position of movable body 20 and serve as joining parts with spring stoppers 22 and 24.

In the present embodiment, in the non-vibration state of movable body 20, movable body cores 41 and 42 are disposed inside (radially inside) coils 61 and 62 so as to be opposite to coils 61 and 62 in the direction orthogonal to the axis direction of coils 61 and 62.

It is to be noted that together with magnet 30, movable body cores 41 and 42 constitute the movable body side magnetic circuit part in the magnetic circuit.

Spring stoppers 22 and 24 have a function of fixing the movable body side magnetic circuit part to elastic support parts 81 and 82. In addition, spring stoppers 22 and 24 are weight parts that function as a weight of movable body 20 and increase the vibration output of movable body 20.

In the present embodiment, spring stoppers 22 and 24 include joining parts 222 and 242 joined to movable body cores 41 and 42, weight body parts 224 and 244, and spring fixing parts 226 and 246.

In the present embodiment, in spring stoppers 22 and 24, each of which is formed in a cylindrical shape with a through hole that opens in the vibration direction, joining parts 222 and 242, weight body parts 224 and 244 and spring fixing parts 226 and 246 are continuously provided in the vibration direction. It is to be noted that a weight can be additionally provided in the through hole, and then the through hole can have a function as a weight adjusting part together with the weight. By additionally providing a weight in the through hole, the weight of movable body 20 can be increased to increase the vibration output of movable body 20.

Joining parts 222 and 242 are joined to movable body cores 41 and 42, respectively. To be more specific, joining parts 222 and 242 are inserted and internally fitted to openings 412 and 422 of movable body cores 41 and 42, respectively. In openings 412 and 422, joining parts 222 and 242 are fixed by bonding using a heat curable adhesive agent such as epoxy resin or an anaerobic adhesive agent, for example.

Weight body parts 224 and 244 are tube members having a larger outer diameter and a larger mass than joining parts 222 and 242 and spring fixing parts 226 and 246.

In addition, weight body parts 224 and 244 are provided at both end portions separated in the vibration direction in movable body 20, and are not provided at the outer periphery side of movable body 20. With this configuration, weight body parts 224 and 244 do no limit the coil installation space located at the outer periphery side of movable body 20, and thus the electromagnetic conversion efficiency is not reduced. Thus, the weight of movable body 20 can be favorably increased, and the high vibration output can be achieved.

Spring fixing part 226 is joined to inner periphery part 802 (see FIG. 4) serving as the inner diameter side end portion of the upper leaf spring serving as elastic support part 81 at one end portion of the vibration direction of movable body 20, or in other words, the upper end portion of movable body 20. On the other hand, spring fixing part 246 is joined to inner periphery part 802 (see FIG. 4) serving as the inner diameter side end portion of the lower leaf spring serving as elastic support part 82 at the other end portion of in the vibration direction of the movable body, or in other words, the lower end portion of movable body 20. It is to be noted that details of elastic support parts 81 and 82 will be described later.

Spring fixing parts 226 and 246 protrude in the vibration direction from weight body parts 224 and 244, and are joined at the ends thereof to inner periphery parts 802 and 802 of elastic support parts 81 and 82. Thus, elastic support parts 81 and 82 are fixed at the ends of spring fixing parts 226 and 246 protruded from weight body parts 224 and 244 as steps from weight body parts 224 and 244. The steps ensure a clearance as an elastic deformation region to the vibration direction for elastic support parts 81 and 82 protruding to the circumferentially outside from inner periphery parts 802 and 802.

Spring stoppers 22 and 24 may serve as a fixing part for fixing the weight or the spring. That is, each of spring stoppers 22 and 24 has a function as weight and a spring fixation function of fixing elastic support parts 81 and 82, and thus it is not necessary to assemble members having such functions. By only providing spring stoppers 22 and 24 to the movable body side magnetic circuit part, the upper leaf spring and the lower leaf spring serving as elastic support parts 81 and 82 can be readily mounted to movable body 20 having the weight function and the spring fixation function, and thus assemblability can be increased.

It is to be noted that spring stoppers 22 and 24 are desirably composed of a non-magnetic material while they may be composed of a magnetic material. With spring stoppers 22 and 24 composed of a non-magnetic material, the magnetic flux from movable body core 41 does not flow upward, and the magnetic flux from movable body core 42 does not flow downward. Thus, the magnetic flux can efficiently flow toward coils 61 and 62 located on the outer periphery side of movable body cores 41 and 42.

In addition, preferably, spring stoppers 22 and 24 are formed of a material having a higher specific gravity (for example, a specific gravity of about 16 to 19) than a silicon steel sheet (the specific gravity of the steel sheet is 7.70 to 7.98) or the like. Examples of the material of spring stoppers 22 and 24 include tungsten. With this configuration, even in the case where the size of the external shape of movable body 20 is set in design and the like, the mass of movable body 20 can be relatively readily increased, and thus a desired vibration output as a sufficient sensory vibration for the user can be achieved.

Fixing Body 50

Fixing body 50 supports movable body 20 through elastic support parts 81 and 82 such that movable body 20 is movable in the vibration direction (the same direction as the coil axis direction and the magnetization direction) inside coils 61 and 62.

In the present embodiment, fixing body 50 includes, in addition to coils 61 and 62, coil holding part 52, upper case (which may be referred to as "first case") 54, lower case (which may be referred to as "second case") 56 and electromagnetic shield part 58.

Coil holding part 52 holds coils 61 and 62 disposed with a predetermined distance therebetween in such a manner as to surround magnet 30, and guides the movement of movable body 20.

Coil holding part 52 is a cylindrical member formed with a resin or the like, and is disposed radially inside coils 61 and 62. Coil holding part 52 includes inner body part 522 interposed between coils 61 and 62 and magnet 30. Inner body part 522 is disposed with a distance from magnet 30 on the inner diameter side of coils 61 and 62. Inner body part 522 prevents magnet 30 and coils 61 and 62 from making contact with each other.

Coil holding part 52 includes, in addition to inner body part 522, outer body part 524 as a concentric cylindrical member disposed to surround the outer periphery side of inner body part 522 with a space therebetween, and center annular part 526 that couples inner body part 522 and outer body part 524.

Outer body part 524 is disposed to surround coils 61 and 62 disposed at the outer peripheral surface of inner body part 522, and the outer peripheral surface of outer body part 524 is covered with cylindrical electromagnetic shield part 58. The opening both end portions (upper and lower end portions) of outer body part 524 sandwich the outer periphery part 806 of elastic support parts 81 and 82 together with upper and lower cases 54 and 56, and are closed with upper and lower cases 54 and 56. By closing the both ends of outer body part 524 with upper and lower cases 54 and 56, a hollow vibration actuator housing is formed.

Center annular part 526 has a disk shape provided between inner body part 522 and outer body part 524 at the center in the axis direction (the vibration direction).

That is, in coil holding part 52, outer body part 524, inner body part 522 and center annular part 526 form pockets (coil insertion parts) recessed in the cross-section with circular openings at both ends in the axis direction. Center annular part 526 forms the bottom portion of the pocket. Coils 61 and 62 are housed and fixed in the recessed pockets.

Inner body part 522 is a cylindrical member that is disposed such that movable body 20 can reciprocate in the axis direction on the inner periphery side, and coils 61 and 62 are disposed side by side in the axis direction (coil axis direction) to surround the outer peripheral surface of inner body part 522.

Inner peripheral surface 522a of inner body part 522 is disposed opposite to the outer peripheral surface of movable body 20 with a predetermined distance therebetween. With this predetermined distance, movable body 20 can move in the axis direction as the vibration direction without making contact with inner peripheral surface 522a. Movable body 20 moves along inner peripheral surface 522a without making contact therewith.

The thickness of inner body part 522 is preferably smaller than the thickness of outer body part 524, and has a strength with which outer circumference side coils 61 and 62 are not affected even when moving movable body 20 makes contact therewith. That is, the durability as coil holding part 52 that holds coils 61 and 62 is ensured mainly by the thickness of inner body part 522 in the radial direction, the axial length of center annular part 526, and the thickness of outer body part 524 in the radial direction.

It is to be noted that with coil holding part 52, a coil line that couples coils 61 and 62 spaced from each other in the axis direction is provided in coil holding part 52, and is guided by a guide groove (omitted in the drawing) communicating between the pockets (slits) having the recessed cross-sectional shapes. Coils 61 and 62 are turned at coil connecting part 521 at the lower portion of coil holding part 52 and connected to the outside. Coil connecting part 521 is located on protrusion 564 of lower case 56. It is to be noted that the guide groove is provided at the outer periphery part of center annular part 526, for example.

In coil holding part 52, coils 61 and 62 are inserted to the pockets (slits) formed by inner body part 522, outer body part 524 and center annular part 526 with a recessed cross-sectional shape with openings on both sides in the axis direction, and coils 61 and 62 are fixed by bonding or sealing. In the present embodiment, coils 61 and 62 are fixed by bonding to all of the inner body part 522, outer body part 524 and center annular part 526. Thus, coils 61 and 62 can increase the joining strength with coil holding part 52, and even in the case where a large impact is applied, the damage to coils 61 and 62 is reduced in comparison with a configuration in which the movable body directly makes contact with the coil.

In vibration actuator 10, coils 61 and 62 vibrate in the axis direction of coils 61 and 62 (the magnetization direction of magnet 30), and are used for generating the driving source of vibration actuator 10 together with magnet 30 and movable body cores 41 and 42. Coils 61 and 62 are energized at the time of driving, and constitutes the voice coil motor together with magnet 30.

In the present embodiment, coils 61 and 62 are composed of self-welding line coils. With this configuration, in mounting to coil holding part 52, it can be inserted and held in the slit pocket having a recessed cross-sectional shape while maintaining the cylindrical shape. Therefore, the coil line will not be untied, and thus assemblability of vibration actuator 10 can be improved.

Preferably, the coil axis of coils 61 and 62 is disposed coaxially with the axis of coil holding part 52 or the axis of magnet 30.

Coils 61 and 62 are held by coil holding part 52 such that the center of the length in the coil axis direction (the vibration direction) is located at substantially the same (or the same) location in the vibration direction as the center of the length in the vibration direction of movable body 20 (to be more specific, the vibration direction of magnet 30). It is to be noted that coils 61 and 62 of the present embodiment are wound in opposite directions such that current flows in opposite directions upon energization.

Figure 16:
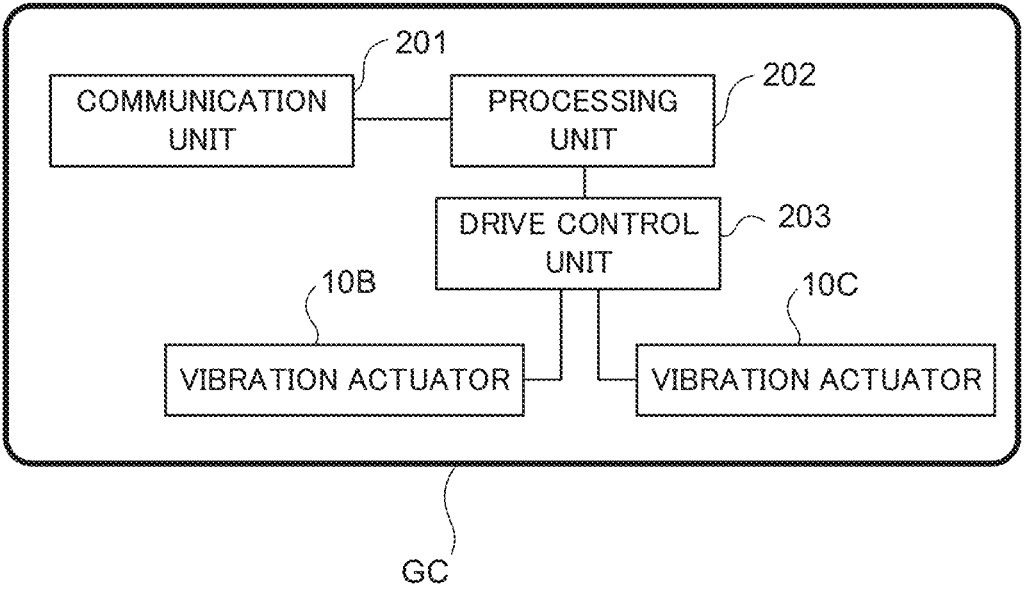
FIG. 16 is a drawing illustrating an example of an electronic apparatus in which the vibration actuator is mounted.
Figure 17:
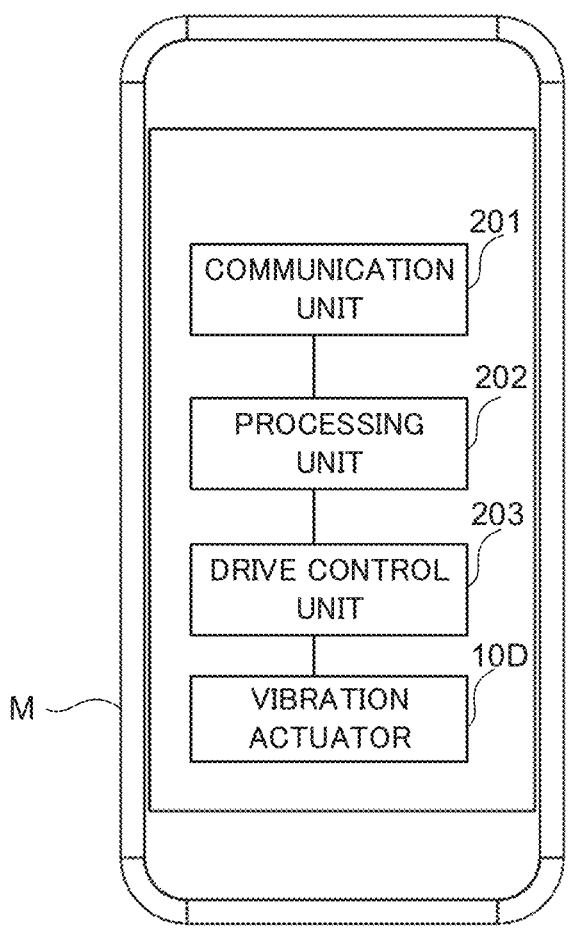
FIG. 17 is a drawing illustrating an example of an electronic apparatus in which the vibration actuator is mounted.

The both end portions of coils 61 and 62 are connected to the power supply part (for example, drive control unit 203 illustrated in FIG. 16 and FIG. 17). For example, the both end portions of coils 61 and 62 are connected to the alternating current supply part, and alternating current power source (AC voltage) is supplied from the alternating current supply part to coils 61 and 62. With this configuration, with the magnet, coils 61 and 62 can generate a thrust for movement in the contacting or separating direction in the respective axis directions.

In the case where in magnet 30, surface 30*a* side on one side (in the present embodiment, the upper side) in the magnetization direction is magnetized to the N pole and rear surface 30*b* side on the other side (in the present embodiment, the lower side) in the magnetization direction is magnetized to the S pole, a magnetic flux radiated from movable body core 41 on surface 30*a* side of magnet 30 to movable body core 42 of rear surface 30*b* side of magnet 30 is formed. To be more specific, the magnetic flux flows such that the magnetic flux is emitted from the surface side of magnet 30 and radiated from movable body core 41 on the upper side of magnet 30 to coil 61 side, so as to impinge on magnet 30 from movable body core 42 on the lower side of magnet 30 through electromagnetic shield part 58 and coil 62. In this manner, the magnetic flux radially traverses coils 61 and 62 at any portion of coils 61 and 62 disposed to surround magnet 30 and movable body cores 41 and 42. With this configuration, when coils 61 and 62 are energized, the Lorentz force acts in the same direction (for example, the −F direction illustrated in FIG. 11) along the magnetization direction.

Upper case 54 and lower case 56 are formed in bottomed cylindrical shapes, and bottom portions 541 and 561 constitute the top surface and bottom surface of vibration actuator 10 of the present embodiment. It is to be noted that upper case 54 and lower case 56 may be recessed metal plates formed by drawing.

Electromagnetic shield part 58 is a cylindrical magnetic substance disposed to cover the outer periphery of coil holding part 52. Electromagnetic shield part 58 functions as an electromagnetic shield, and prevents leakage of the magnetic flux to the outside of vibration actuator 10. With this electromagnetic shield effect of electromagnetic shield part 58, leakage of the magnetic flux to the outside of the vibration actuator can be reduced.

In addition, together with coils 61 and 62, magnet 30, and movable body cores 41 and 42, electromagnetic shield part 58 also functions as the magnetic circuit, and thus the electromagnetic conversion efficiency can be increased by increasing the thrust constant. Electromagnetic shield part 58 functions as a magnetic spring together with magnet 30 by utilizing the magnetic attractive force of magnet 30.

Figure 12:
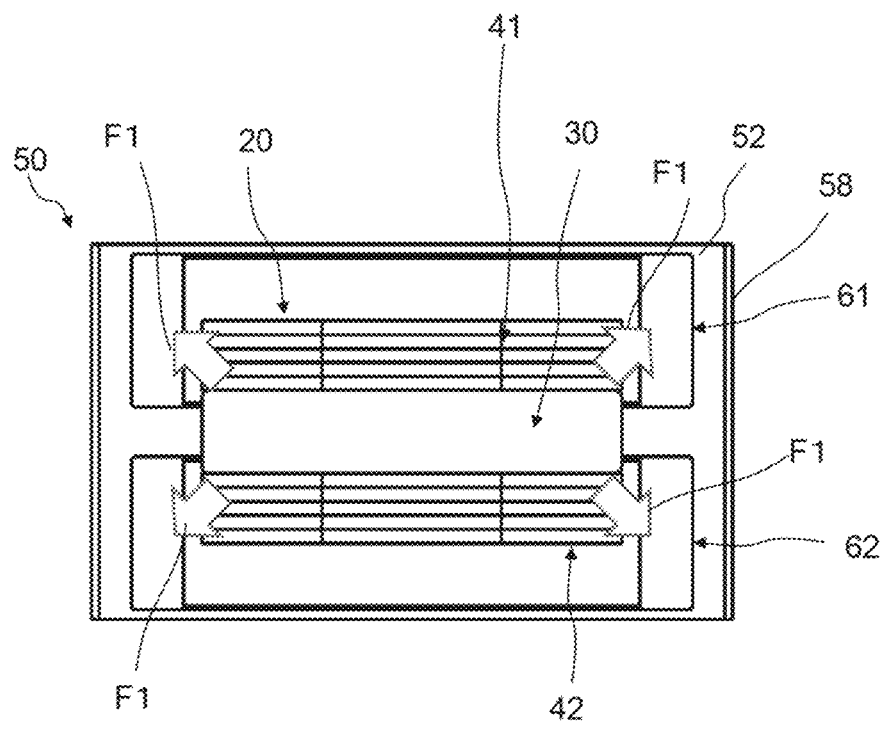
FIG. 12 is a drawing schematically illustrating a balanced position of a coil and a magnet.
Figure 13:
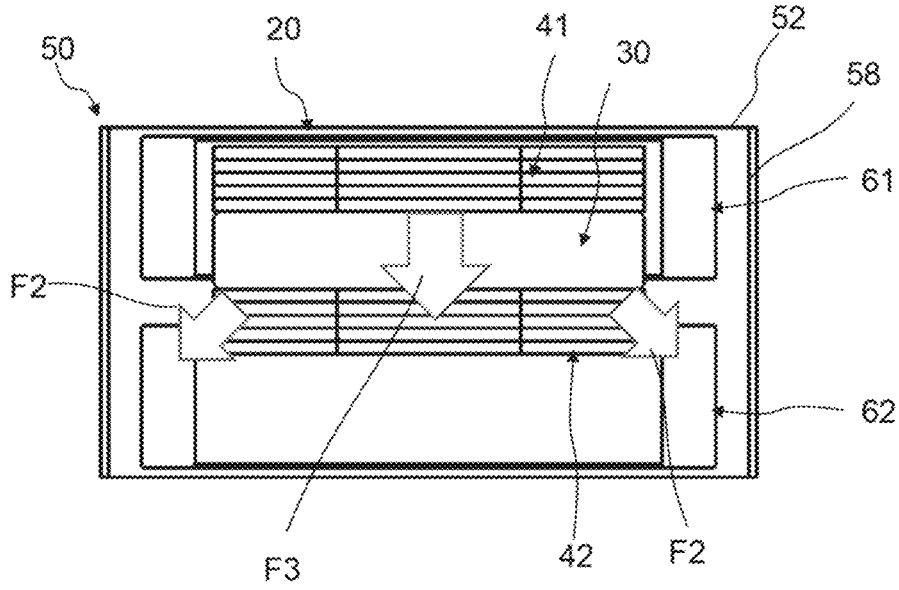
FIG. 13 is a drawing schematically illustrating a relative movement of the coil and the magnet.

Inside electromagnetic shield part 58, the center of the length of electromagnetic shield part 58 in the vibration direction is located at the center of vibration direction of magnet 30. With this configuration, as illustrated in FIG. 12, magnetic attractive force F1 acts between magnet 30 and electromagnetic shield part 58 in the non-driving state. Thus, as illustrated in FIG. 13, even when movable body 20 excessively moves to one side in the vibration direction, magnetic attractive force F2 is generated between magnet 30 and electromagnetic shield part 58, and movable body 20 is returned to the original position with the force of thrust F3.

The total spring constant is the sum of the spring constant of the leaf spring as elastic support parts 81 and 82 and the spring constant of the magnetic spring of magnet 30 and electromagnetic shield part 58. With this configuration, the spring constant of the leaf spring can be reduced. As a result, the stress of the leaf spring is reduced and the negative influence on the lifetime is suppressed. In this manner, the reliability of vibration actuator 10 can be increased.

Bottom portion 541 of upper case 54 and bottom portion 561 of lower case 56 are disk-shaped members, and circumferentially extended annular step parts are provided at a position closer to bottom portions 541 and 561 than the opening edge inside cylindrical peripheral wall parts 542 and 562 that rise from the outer peripheral edges of bottom portions 541 and 561 (see FIG. 2).

It is to be noted that in the present embodiment, the outer surfaces of peripheral wall parts 542 and 562 are flush with the outer surface of electromagnetic shield part 58 surrounding coils 61 and 62. With this configuration, vibration actuator 10 is formed in a small and simple substantially columnar shape (barrel shape) with a flat outer peripheral surface, and thus its installation space can be formed in a simple columnar shape.

Upper case 54 and lower case 56 are fitted with the opening edge parts of coil holding part 52 at the step parts, and sandwich and fix outer periphery parts 806 of elastic support parts 81 and 82 with the opening edge parts. The length from the bottom portions 541 and 561 to the step part can be defined by the movable range of movable body 20. The movable range of movable body 20 is set such that movable body 20 vibrates within the movable range with deformation of elastic support parts 81 and 82.

Upper case 54 and lower case 56 of fixing body 50 have a function as a movable range suppressing mechanism serving as hard stop (movable range limitation) HS through the movable body space with the length from bottom portions 541 and 561 to the step part where elastic support parts 81 and 82 are fixed. That is, the movable body space is defined in a length range within which plastic deformation of elastic support parts 81 and 82 does not occur. With this configuration, even when a force exceeding the movable range is exerted on movable body 20, elastic support parts 81 and 82 make contact with fixing body 50 with no plastic deformation. Thus, elastic support parts 81 and 82 are not damaged and the reliability can be increased.

Elastic Support Parts 81 and 82

Elastic support parts 81 and 82 are provided across movable body 20 and fixing body 50 in a direction orthogonal to the vibration direction in such a manner as to sandwich movable body 20 in the vibration direction of movable body 20, and to support movable body 20 with respect to fixing body 50 such that movable body 20 can reciprocate in the vibration direction.

In the present embodiment, as illustrated in FIG. 2 to FIG. 4, elastic support parts 81 and 82 are connected to fixing body 50 at the end portions separated in the vibration direction in movable body 20.

In elastic support parts 81 and 82, inner periphery part 802 is fit to the end portions (spring fixing parts 226 and 246) separated in the axis direction (the vibration direction) of movable body 20 and thus it is attached to movable body 20 such that outer periphery part 806 side is on the radially outside.

Elastic support parts 81 and 82 support movable body 20 such that movable body 20 does not make contact with fixing body 50 when movable body 20 is in the non-vibration state and the vibration state. It is to be noted that with elastic support parts 81 and 82, even when movable body 20 makes contact with inner peripheral surface 522a of inner body part 522 at the time of driving, magnetic circuits, or to be more specific, coils 61 and 62 are not damaged. Elastic support parts 81 and 82 may be composed of any member as long as movable body 20 is movably elastically supported.

Elastic support parts 81 and 82 may be composed of non-magnetic substances, or magnetic substances (to be more specific, ferromagnetic substances). In the case where elastic support parts 81 and 82 are composed of a non-magnetic substance leaf spring, stainless-steel sheets of SUS304, SUS316 or the like may be used. In addition, in the case where elastic support parts 81 and 82 are composed of a magnetic substance, stainless-steel sheets of SUS301 and the like are applicable.

In the case where elastic support parts 81 and 82 are disposed at positions where the influence of the magnetic field of the magnetic circuit in movable body 20 is small in a vibration actuator, the material of elastic support parts 81 and 82 may be a non-magnetic material, or a magnetic material. In addition, in the case where elastic support parts 81 and 82 are disposed at position where the influence of the magnetic field of the magnetic circuit in movable body 20 is large, elastic support parts 81 and 82 are preferably composed of a non-magnetic material as non-magnetic substances.

As an example of the material of elastic support parts 81 and 82, it is known that magnetic materials (such as SUS301) have higher durability and less inexpensive than non-magnetic materials (such as SUS304 and SUS316).

In vibration actuator 10 of the present embodiment, elastic support parts 81 and 82 are disposed at positions where the influence of the magnetic field of the magnetic circuit in movable body 20 is small, and therefore, for example, a magnetic material (ferromagnetic material) such as SUS301 is used as the material of elastic support parts 81 and 82. In this manner, in the present embodiment, elastic support parts 81 and 82 have a higher durability and are less expensive in comparison with the case where a non-magnetic material is used, and it is thus possible to achieve vibration actuator 10 having excellent durability with a reduced cost.

As illustrated in FIG. 4, elastic support parts 81 and 82 are composed of a plurality of planar leaf springs. In movable body 20, elastic support parts 81 and 82 may be composed of three or more leaf springs. Such a plurality of leaf springs is attached along the direction orthogonal to the vibration direction.

Elastic support parts 81 and 82 serving as leaf springs have shapes in which annular inner periphery part 802 serving as an inner spring end portion and outer periphery part 806 serving as an outer spring end portion are joined with elastically deformable arc-like deformation arm 804. When deformation arm 804 is deformed, inner periphery part 802 and outer periphery part 806 are relatively displaced with respect to the axis direction.

In elastic support parts 81 and 82, outer periphery part 806 is joined to fixing body 50, and inner periphery part 802 is joined to movable body 20.

In the present embodiment, the leaf springs as elastic support parts 81 and 82 are formed by metal working using a stainless-steel sheet, or to be more specific, elastic support parts 81 and 82 are thin tabular disc-shaped spiral springs. Since elastic support parts 81 and 82 have plate shapes, the positional accuracy can be improved, that is, the working accuracy can be improved in comparison with a spring of a cone shape.

In the present embodiment, in the plurality of elastic support parts 81 and 82 with the same spiral direction, outer periphery part 806 serving as one end of the outer circumference side is fixed to fixing body 50, and inner periphery part 802 serving as the other end of inner periphery side is fixed to movable body 20.

As described above, in the present embodiment, as the plurality of elastic support parts 81 and 82, a plurality of spiral leaf springs is attached to the end portions separated in the vibration direction in movable body 20. With this configuration, in vibration actuator 10, in the case where movable body 20 is elastically supported with respect to fixing body 50, as the movement amount of movable body 20 is increased, movable body 20 moves in the lateral direction (here, the direction on a plane perpendicular to the vibration direction) while being slightly rotated. If the plurality of leaf springs has the opposite spiral directions, the plurality of leaf springs moves in the compressing direction or the pulling direction, and smooth movement is hampered.

Elastic support parts 81 and 82 of the present embodiment are fixed to movable body 20 such that the spiral directions are the same, and therefore even when the movement amount of movable body 20 is large, smooth movement, or in other words, deformation, can be achieved. Thus, a large amplitude can be achieved and the vibration output can be increased.

Elastic support parts 81 and 82 are fixed to the ends of spring fixing parts 226 and 246 protruding to form steps at the outer periphery part from weight body parts 224 and 244 at the end portions in movable body 20 separated in the vibration direction (in the present embodiment, the vertical direction) of movable body 20. Elastic support parts 81 and 82 are disposed to extend in the direction orthogonal to the vibration direction from the ends of spring fixing parts 226 and 246, and thus the step ensures the elastic deformation region. In this manner, the elastic support part can be created with a reduced cost, and the reliability of the vibration actuator itself using the same can be improved.

In the present embodiment, elastic support parts 81 and 82 and movable body 20 are firmly joined through fixation pins 26 and 28 such that they are not dropped due to the vibration of movable body 20.

Fixation pins 26 and 28 illustrated in FIG. 2 to FIG. 4 include flanges 264 and 284 at opening edge parts of cylindrical pin bodies 262 and 282 that can be press fit to spring fixing parts 226 and 246.

Figure 5A:
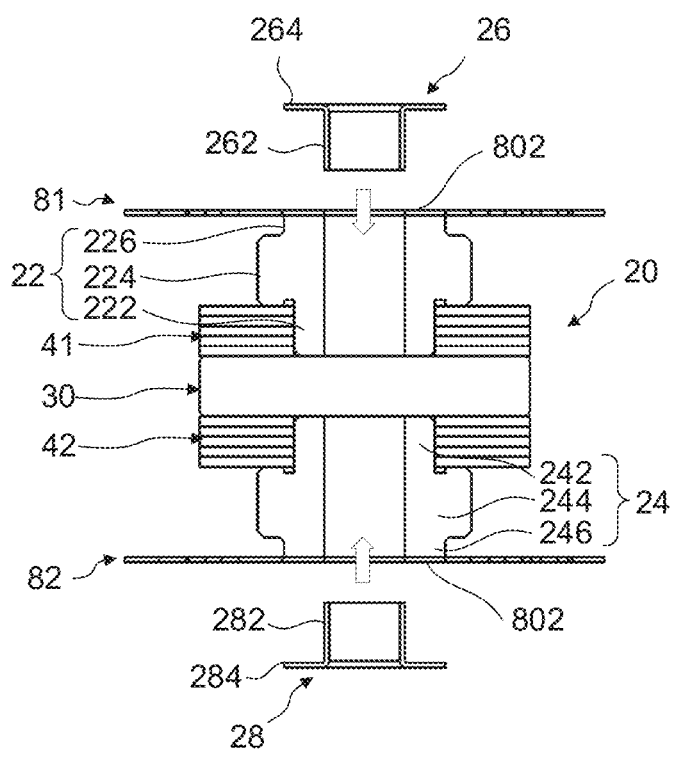
FIG. 5A and FIG. 5B illustrate a state where the elastic support part and the movable body are coupled with each other.
Figure 5B:

FIG. 5A and FIG. 5B are drawings illustrating a coupling state of elastic support parts 81 and 82 and movable body 20.

As illustrated in FIG. 5A, when plate-shaped elastic support parts 81 and 82 are fixed to movable body 20, inner periphery parts 802 of elastic support parts 81 and 82 is placed on spring fixing parts 226 and 246 serving as the end portions of vibration direction of movable body 20. Next, pin bodies 262 and 282 of fixation pins 26 and 28 are pressed into the through holes that open at spring fixing parts 226 and 246 through the openings of inner periphery parts 802 and 802 of plate-shaped elastic support parts 81 and 82.

With this configuration, as illustrated in FIG. 5B, with spring fixing parts 226 and 246, flanges 264 and 284 sandwich inner periphery parts 802 of elastic support parts 81 and 82, and elastic support parts 81 and 82 are firmly joined to spring fixing parts 226 and 246.

When movable body 20 is reciprocated, no dropping occurs even when a large force is applied to spring fixing parts 226 and 246. In addition, for example, it is more resistant to repetitive vibration in comparison with the case where fixation is achieved by bonding alone.

In addition, inner periphery parts 802 of elastic support parts 81 and 82 and spring fixing parts 226 and 246 may be joined by welding, bond, swaging or the like, or still alternatively, they may be joined by a combination of welding, bond, and swaging.

Figure 6A:
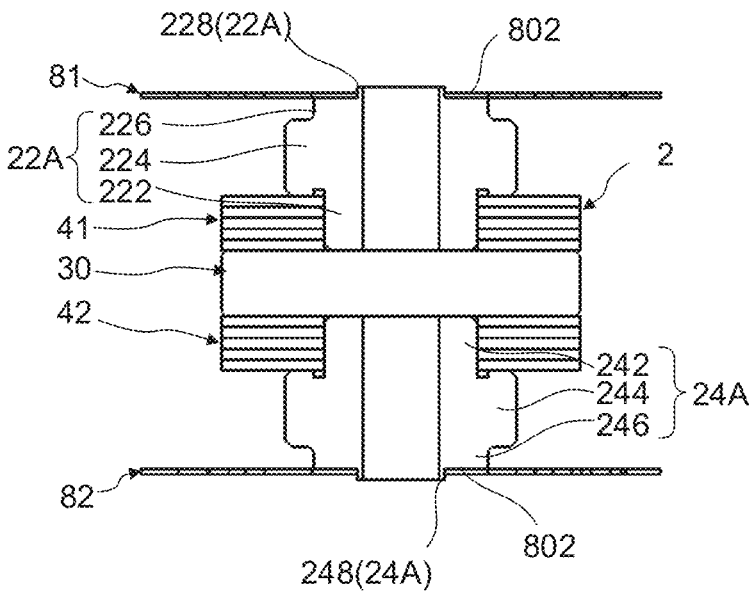
FIG. 6A and FIG. 6B illustrate a modification of the state where the elastic support part and the movable body are coupled with each other.
Figure 6B:
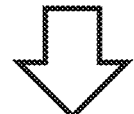
Figure 6B:
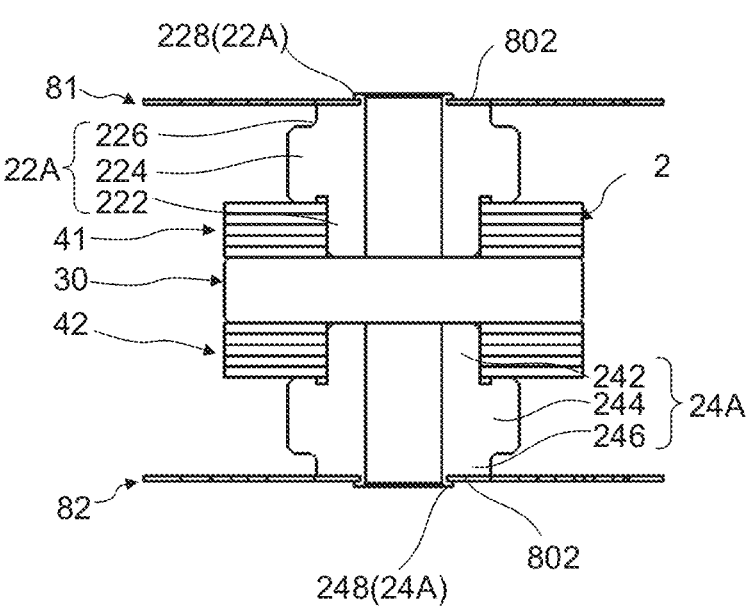

FIG. 6A and FIG. 6B are drawings illustrating a modification of a coupling state of elastic support parts 81 and 82 and movable body 20.

In comparison with the configuration of movable body 20, in movable body 20 illustrated in FIG. 6A and FIG. 6B, spring fixing parts 226 and 246 of spring stoppers 22A and 24A having a similar configuration as spring stoppers 22 and 24 include cylindrical swaging parts 228 and 248 protruding from the peripheries of the through holes that open to the vibration direction.

As illustrated in FIG. 6A, swaging parts 228 and 248 are inserted to the openings of inner periphery parts 802 of elastic support parts 81 and 82. Desirably, the outer periphery of cylindrical swaging parts 228 and 248 has a diameter that internally fitted to inner periphery part 802 of elastic support parts 81 and 82. In addition, the protrusion length of swaging parts 228 and 248 from the surface where inner periphery part 802 is placed is greater than the thickness of elastic support parts 81 and 82.

Figure 5B:
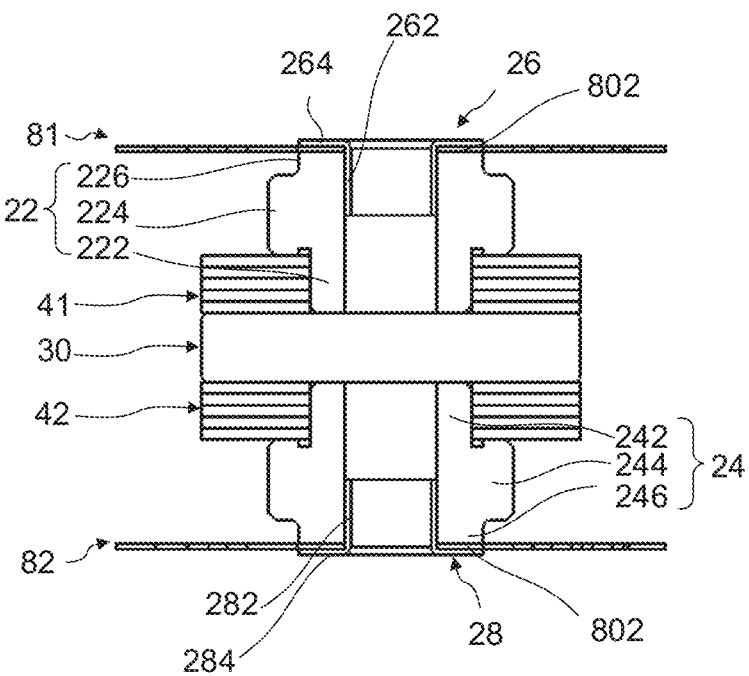

As illustrated in FIG. 6A, by inserting inner periphery parts 802 and 802 to swaging parts 228 and 248 and crushing swaging parts 228 and 248 for swaging, elastic support parts 81 and 82 and spring fixing parts 226 and 246 are firmly joined to each other. This configuration can reduce the number of components and man hours for assembly, and thus can increase the productivity in comparison with the configuration illustrated in FIG. 5 in which fixation pins 26 and 28 are used. In addition, the joining of elastic support parts 81 and 82 and spring fixing parts 226 and 246 can be achieved through welding or bonding, in addition to swaging.

On the other hand, as described above with FIG. 2, outer periphery part 806 of elastic support part 81 is fixed, on the outside in the radial direction, to fixing body 50 by being sandwiched between inner periphery portion the opening (the step part of the inner periphery side) of peripheral wall part 542 of upper case 54 and the opening edge of outer body part 524 of coil holding part 52.

As illustrated in FIG. 2, outer periphery part 806 of elastic support part 82 is fixed, on the outside in the radial direction, to fixing body 50 by being sandwiched between the opening edge of outer body part 524 of coil holding part 52 and the step part inside the opening of peripheral wall part 562 of lower case 56.

In this manner, between the upper and lower opening edges of outer body part 524 of coil holding part 52 and upper and lower cases 54 and 56 that close the opening edges by being fit thereto, elastic support parts 81 and 82 are sandwiched in the state where they are disposed in the direction orthogonal to the vibration direction.

In the present embodiment, in elastic support parts 81 and 82, attenuation part (damper) 72 serving as an attenuation means for attenuating the vibration generated at elastic support parts 81 and 82 is attached to deformation arm 804 or to deformation arm 804 and outer periphery part 806. In elastic support parts 81 and 82, the attenuation means suppresses the resonance peak, and generates stable vibration over a wide range.

Figure 7:
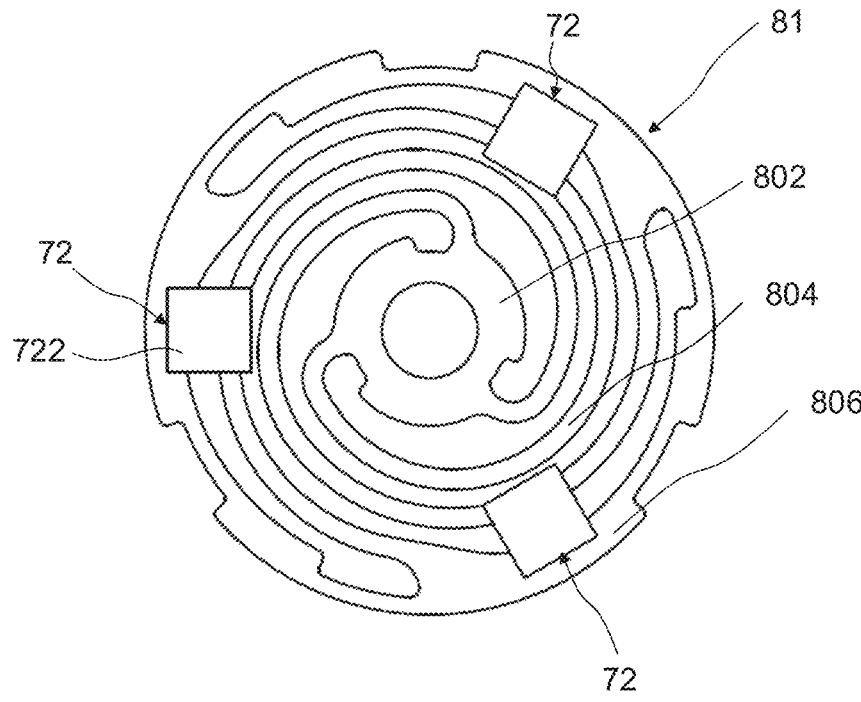
FIG. 7 is a plan view of the elastic support part including an attenuation part.
Figure 8:
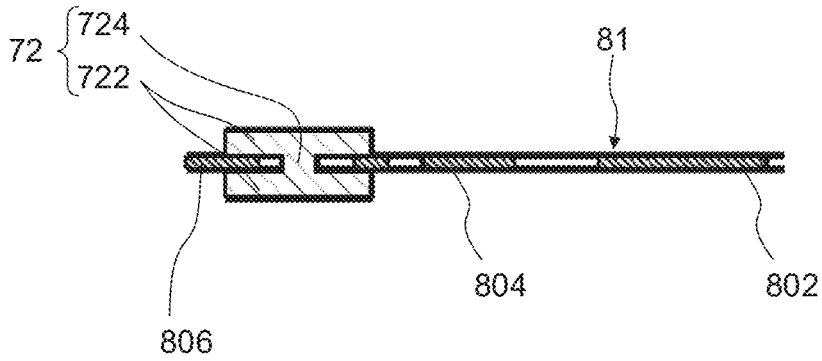
FIG. 8 is a partial sectional view of the elastic support part including the attenuation part.

FIG. 7 is a plan view of elastic support part 81 including an attenuation part, and FIG. 8 is a partial sectional view of the elastic support part of attenuation part 72. It is to be noted that while elastic support part 82 also includes attenuation part 72, elastic support part 82 has a configuration similar to that of elastic support part 81, and therefore the description thereof is omitted.

As illustrated in FIG. 7 and FIG. 8, attenuation part 72 of the present embodiment is an elastic member of an elastomer having H-cross-sectional shape or the like in which center portions of a pair of opposite flanges 722 disposed in parallel with each other are coupled with rib (pushing part) 724. Attenuation part 72 is disposed by inserting an elastomer to the bridge portion of elastic support part 81 serving as a leaf spring, which is between outer periphery part 806 and deformation arm 804 in the present embodiment, such that it makes contact therewith. A plurality of attenuation parts 72 are attached to elastic support part 81 without being firmly fixed thereto.

Attenuation part 72 serving as the attenuation means attenuates a sharp spring resonance at elastic support part 81 and prevents a large vibration difference among the frequencies due to the vibration significantly increased near the resonance frequency. With this configuration, before plastic deformation, movable body 20 vibrates without making contact with bottom portions 541 and 561, and causes no abnormal noise due to the contact.

The shape, material and the like of attenuation part 72 are not limited as long as the generation of shape vibration at elastic support part 81 (82) can be prevented.

Figure 9:
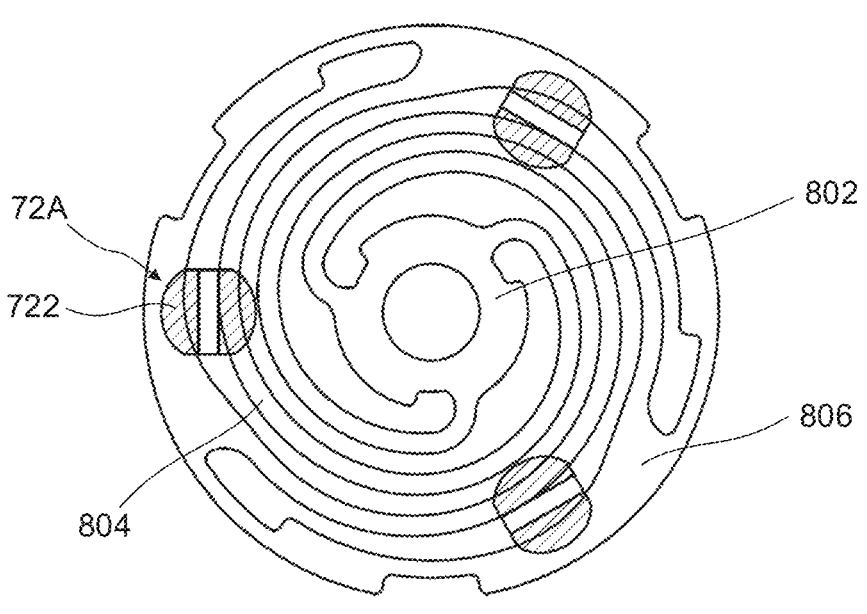
FIG. 9 is a plan view of a modification of the elastic support part including the attenuation part.
Figure 10:
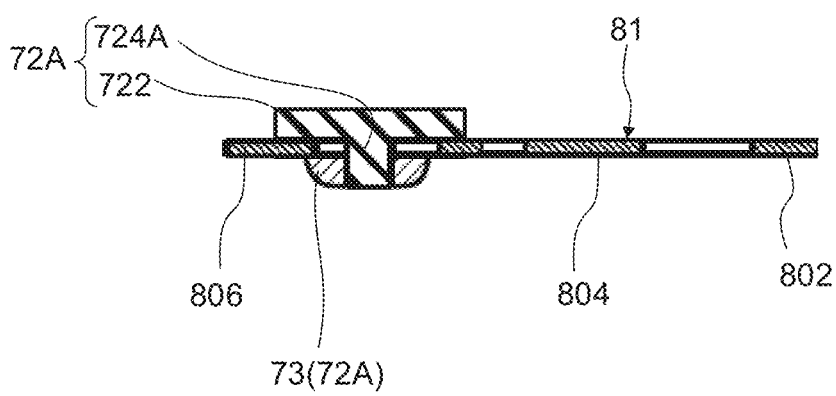
FIG. 10 is a partial sectional view of a modification of the elastic support of the attenuation part.

FIG. 9 and FIG. 10 are plan views and partial sectional views of an elastic support part including attenuation part 72A as a modification.

Attenuation part 72A illustrated in FIG. 9 and FIG. 10 is an elastomer having a T-cross-sectional shape, and includes plate-shaped flange 722 and pushing part 724A protruding from the center portion of flange 722.

In attenuation part 72A, pushing part 724A is inserted from the one surface side of elastic support part 81 to the area between spring portions, or to be more specific, the area between outer periphery part 806 and deformation arm 804 such that flange 722 is provided as abridge between the spring portions. Attaching portion 73 is an ultraviolet curable resin, an adhesive agent that is not firmly fixed to elastic support part 81 or the like, and is fixed to pushing part 724A with a shape with which pushing part 724A is not dropped from the area between the spring portions on the rear surface side of elastic support part 81.

With this configuration, attenuation part 72A can reduce the component costs in comparison with attenuation part 72 having the H-cross-sectional shape, can achieve an attenuation effect comparable to that of attenuation part 72 to suppress the resonance peak, and can generate stable vibration over a wide range.

That is, in vibration actuator 10, it can be said that movable body 20 corresponds to the mass part of a vibration model of a spring-mass system, and thus the sharp peak is suppressed by attenuating the vibration when there is a sharp resonance (sharp peak). By attenuating the vibration, the sharp resonance is eliminated, and vibration of a suitable and stable maximum movement amount is output with no unevenness of the maximum amplitude value and the maximum movement amount of movable body 20 at resonance.

Figure 11:
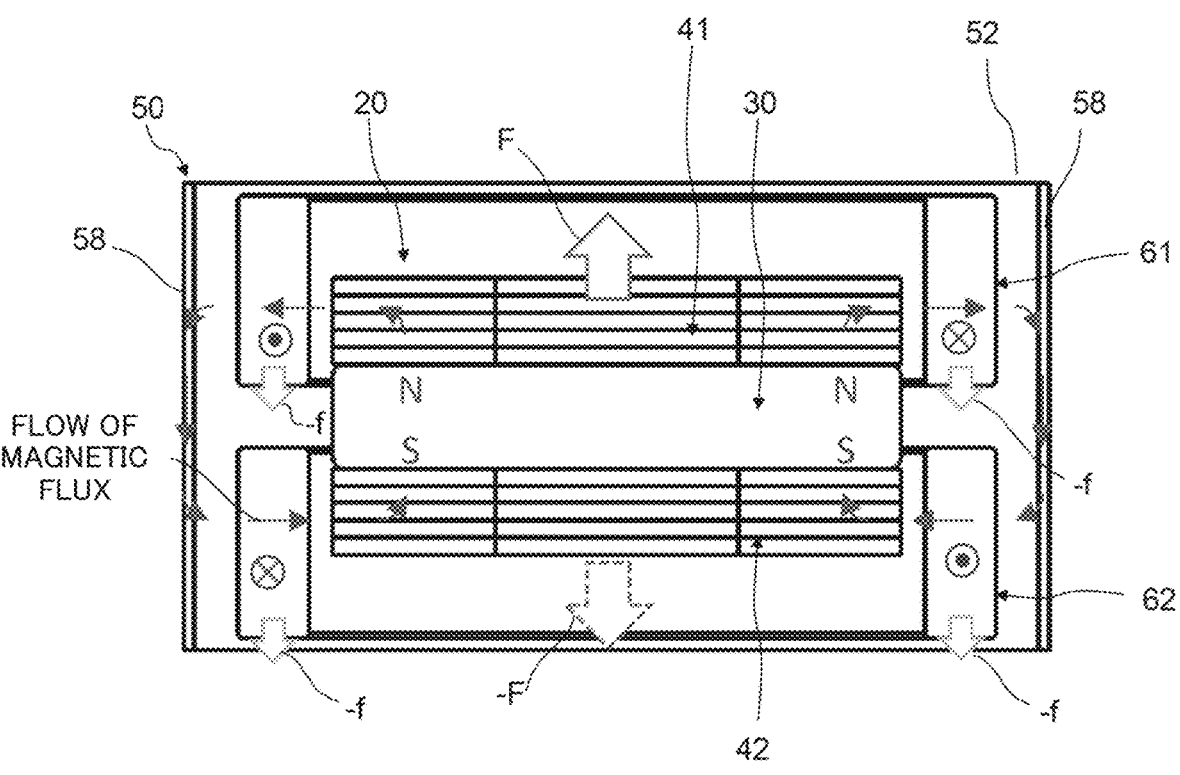
FIG. 11 is a drawing schematically illustrating a magnetic circuit configuration of the vibration actuator.

In vibration actuator 10, the magnetic circuit illustrated in FIG. 11 is formed. In addition, in vibration actuator 10, coils 61 and 62 are disposed such that the coil axis is orthogonal to the magnetic flux of movable body cores 41 and 42 sandwiching magnet 30 in the vibration direction. Accordingly, as illustrated in FIG. 11, when coils 61 and 62 are energized, a Lorentz force in the −F direction is generated at coils 61 and 62 in accordance with Fleming's left hand rule with the interaction between the magnetic field of magnet 30 and the current flowing through coils 61 and 62.

The Lorentz force in the −F direction is in the direction orthogonal to the magnetic field direction and the direction of the current flowing through coils 61 and 62. Since coils 61 and 62 are fixed to fixing body 50 (coil holding part 52), a force opposite to the Lorentz force in the −F direction is generated as a thrust of an F direction at movable body 20 including magnet 30 in accordance with the action-reaction law. With this configuration, movable body 20 including magnet 30 moves to the F direction, or in other words, to bottom portion 541 side of upper case 54.

In addition, when the energization direction of coils 61 and 62 is switched to the opposite direction and coils 61 and 62 are energized, the Lorentz force of the opposite F direction is generated. When the Lorentz force of the F direction is generated, the force opposite to the Lorentz force of the F direction is generated at movable body 20 as a thrust (a thrust of the F direction) in accordance with the action-reaction law. As a result, movable body 20 move to the −F direction, or in other words, to lower case 56 side of bottom portion 561 of fixing body 50.

Vibration actuator 10 includes fixing body 50 including coils 61 and 62, movable body 20 including magnet 30 that is magnetized in the axis direction of coils 61 and 62 and disposed radially inside of coils 61 and 62, and plate-shaped elastic support parts 81 and 82 that elastically hold movable body 20 such that movable body 20 is movable in the vibration direction.

In addition, inner body part 522 is provided between coils 61 and 62 and outer peripheral surface 30a of movable body 20, and elastic support parts 81 and 82 support movable body 20 such that they do not make contact with each other when movable body 20 is in the non-vibration state and the vibration state.

With this configuration, with respect to fixing body 50, movable body 20 is supported with a gap from inner body part 522 in the non-vibration state with no movement and in the vibration state with movement, and thus movable body 20 does not make contact with fixing body 50 when it is moving, or in other words, vibrating.

In addition, for example, when vibration actuator 10 is dropped, movable body 20 makes contact with inner body part 522 only when the impact is applied to vibration actuator 10 itself. That is, only when there is an impact, movable body 20 and inner body part 522 relatively move in a range between outer peripheral surface 20a of movable body 20 and inner peripheral surface 522a of inner body part 522, and the movement of movable body 20 is restricted by making contact with inner body part 522.

In this manner, in vibration actuator 10, when an impact is applied to vibration actuator 10, movable body 20 is displaced and brought into contact with the inner wall of the fixing body, without exerting an impact unlike in known vibration actuators. That is, coils 61 and 62 of fixing body 50 are not damaged by an impact. In addition, with an impact, inner body part 522 restricts the movement of movable body 20, and thus elastic support parts 81 and 82 are not deformed by the impact. As a result, it is possible to eliminate failures such as a failure of movement of movable body 20 caused by deformation of elastic support parts 81 and 82. In addition, since vibration actuator 10 causes movable body 20 to reciprocate without sliding it on a shaft, the movement of movable body 20 does not generate a sound of sliding movement on the shaft as a matter of course.

In this manner, with vibration actuator 10, a preferable sensory vibration with high vibration performance can be achieved while providing impact resistance.

Here, vibration actuator 10 is driven by an alternating current wave input from the power supply part (for example, drive control unit 203 illustrated in FIG. 16 and FIG. 17) to coils 61 and 62. That is, the energization direction of coils 61 and 62 is cyclically switched, and the thrust of the F direction on bottom portion 541 side of upper case 54 and the thrust of the −F direction on bottom portion 561 side of lower case 56 alternately act on movable body 20. With this configuration, movable body 20 vibrates in the vibration direction (the winding axis direction orthogonal to the radial direction of coils 61 and 62, or the magnetization direction of magnet 30).

In the following description, a driving principle of vibration actuator 10 will be briefly described. In vibration actuator 10 of the present embodiment, movable body 20 vibrates with respect to fixing body 50 by resonance frequency $f_r$ [Hz] calculated from the following Equation (1), where m [kg] represents the mass of movable body 20, and $K_{s\ p}$ represents the spring constant of the spring (elastic support parts 81 and 82 of the spring).

[Equation 1]

$$f_r = \frac{1}{2\pi}\sqrt{\frac{K_{sp}}{m}} \qquad (1)$$

It can be said that movable body 20 constitutes the mass part of a vibration model of a spring-mass system, and therefore, when an alternating current wave of a frequency equal to resonance frequency $f_r$ of movable body 20 is input to coils 61 and 62, movable body 20 is brought into a resonance state. That is, movable body 20 can be efficiently vibrated by inputting, from the power supply part to coils 61 and 62, an alternating current wave of a frequency substantially equal to resonance frequency $f_r$ of movable body 20.

An equation of motion and a circuit equation indicating a driving principle of vibration actuator 10 are described below. Vibration actuator 10 is driven by the equation of motion represented by the following Equation (2) and the circuit equation represented by the following Equation (3).

[Equation 2]

$$m\frac{d^2x(t)}{dt^2} = K_f i(t) - K_{sp}x(t) - D\frac{dx(t)}{dt} \qquad (2)$$

m: mass [kg]
x(t): displacement [m]
$K_f$: thrust constant [N/A]
i(t): current [A]
$K_{sp}$: spring constant [N/m]
D: attenuation coefficient [N/(m/s)]

[Equation 3]

$$e(t) = Ri(t) + L\frac{di(t)}{dt} + K_e\frac{dx(t)}{dt} \qquad (3)$$

e (t): voltage [V]
R: resistance [Ω]
L: inductance [H]
$K_e$: counter electromotive force constant [V/(rad/s)]

That is, mass m [kg], displacement x(t) [m], thrust constant $K_f$ [N/A], current i(t) [A], spring constant $K_{sp}$ [N/m], attenuation coefficient D [N/(m/s)] and the like in vibration actuator 10 can be appropriately changed within a range that satisfies Equation (2). In addition, voltage e(t) [V], resistance R [Ω], inductance L [H], and counter electromotive force constant $K_e$ [V/(rad/s)] can be appropriately changed within a range that satisfies Equation (3).

As described above, in vibration actuator 10, an efficiently large vibration output can be obtained when coils 61 and 62 are energized with an alternating current wave corresponding to the resonance frequency $f_r$ determined by the mass m of movable body 20 and the spring constant $K_{sp}$ of elastic support parts 81 and 82 as leaf springs.

In addition, vibration actuator 10 is driven by a resonance phenomenon at the resonance frequency represented by Equation (1), satisfying Equations (2) and (3). With this configuration, in vibration actuator 10, the power that is consumed in a normal state is only the loss at attenuation part 72. It is possible to achieve driving with a low power consumption, or in other words, linear reciprocation of movable body 20 with a low power consumption.

According to the present embodiment, since plate-shaped elastic support parts 81 and 82 are disposed on the upper and lower side (in the vibration direction) of movable body 20, movable body 20 can be stably driven in the vertical direction while efficiently distributing the magnetic flux of coils 61 and 62 from elastic support parts 81 and 82 on the upper and lower side of magnet 30. With this configuration, as a vibration motor, a vibration of high output can be achieved.

In addition, fixing body 50 includes coil holding part 52 having a function of holding coils 61 and 62 and a function of protecting coils 61 and 62 with respect to movable body 20. With this configuration, in the case where vibration actuator 10 receives an impact, fixing body 50 can sustain the impact and does not cause damage such as deformation in elastic support parts 81 and 82. In addition, for coils 61 and 62, the impact is transmitted through resin inner body part 522, and thus highly reliable vibration actuator 10 can be achieved while suppressing the damage.

Embodiment 2

Figure 14:
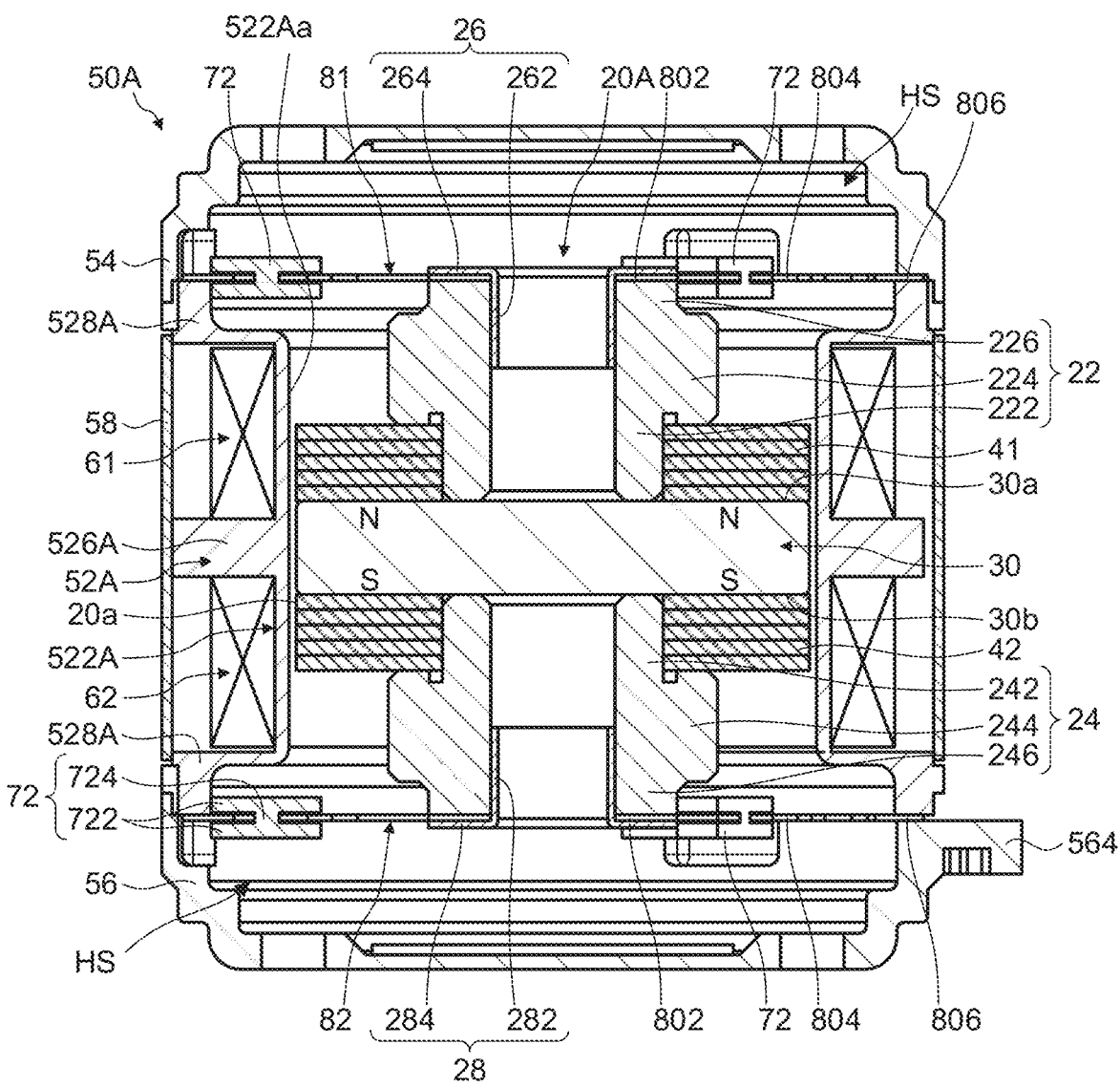
FIG. 14 is a longitudinal sectional view illustrating a vibration actuator according to Embodiment 2 of the present invention.
Figure 15:
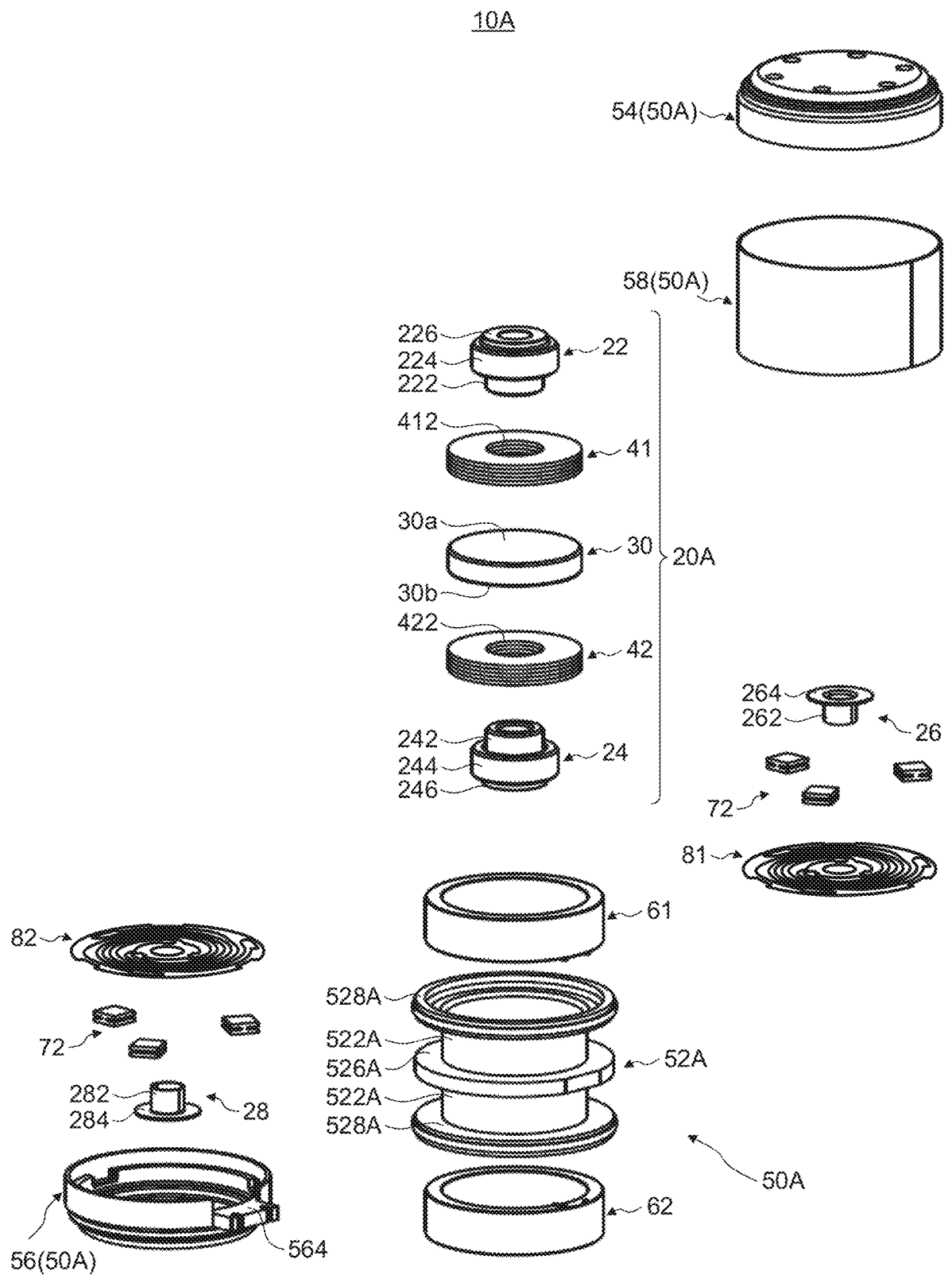
FIG. 15 is an exploded perspective view of the vibration actuator according to Embodiment 2 of the present invention.

FIG. 14 is a longitudinal sectional view including a vibration actuator according to Embodiment 2 of the present invention, and FIG. 15 is an exploded perspective view of a vibration actuator according to Embodiment 2 of the present invention.

Vibration actuator 10A illustrated in FIG. 14 and FIG. 15 has substantially the same configuration as that of vibration actuator 10 according to Embodiment 1 illustrated in FIG. 1 to FIG. 13, and vibration actuator 10A differs in coil holding part 52A in the configuration of vibration actuator 10. In vibration actuator 10A, the components similar to those of vibration actuator 10 have similar operations and effects. In the following description, the same components are denoted by the same reference numerals, and reiterated descriptions will be omitted.

That is, in vibration actuator 10A illustrated in FIG. 14 and FIG. 15, movable body 20A is housed in columnar fixing body 50A such that it can vibrate in the axis direction of the columnar shape. When movable body 20A moves, vibration actuator 10A itself serves as a vibrating member.

Vibration actuator 10A includes movable body 20A including magnet 30 and movable body cores 41 and 42, fixing body 50A including coils 61 and 62, and plate-shaped elastic support parts 81 and 82 that reciprocally support movable body 20A with respect to fixing body 50A.

At cylindrical coil holding part 52A disposed to surround the outer periphery of magnet 30, vibration actuator 10A holds coils 61 and 62 on the outer periphery side of coil holding part 52A.

Coil holding part 52A has a cylindrical shape, and includes recessed coil attaching portion 522A that opens radially outward on the outer circumference side for disposing coils 61 and 62. Coil attaching portion 522A is formed with ribs 528A, 528A and 526A protruding from the outer surface of the cylindrical part with a space therebetween in the axis direction. Coils 61 and 62 disposed in coil attaching portion 522A are fixed in coil attaching portion by bonding or the like in the state where they are surrounded and sealed with electromagnetic shield part 58 surrounding the outer peripheral surface of coil holding part 52A. It is to be noted that coil attaching portion 522A is formed as a recess that opens radially outward and extends in the circumferential direction at the outer periphery of coil holding part 52A, and thus also functions as a coil insertion part for insertion of coils 61 and 62 from the radially outside.

Coils 61 and 62 are disposed by winding a coil line on coil holding part 52A from the outside of coil holding part 52A. Thus, to maintain cylindrical coils 61 and 62, it can be assembled without using a self-welding line. In this manner, the same operations and effects as Embodiment 1 can be achieved, and the cost of coils 61 and 62 can be reduced, and in turn, the cost of the entire vibration actuator 10A can be reduced.

Examples of Electronic Apparatus

FIG. 16 and FIG. 17 are drawings illustrating an example of the mounting state of vibration actuators 10 and 10A. FIG. 16 is a drawing illustrating an example in which vibration actuator 10 is mounted in game controller GC, and FIG. 17 is a drawing illustrating an example in which vibration actuator 10 is mounted in mobile terminal M.

Game controller GC is, for example, connected to a game machine body through wireless communication, and is held or grasped by a user. Here, game controller GC has a rectangular plate-shape, which is operated by the user by holding it with hands at the left and right sides of game controller GC.

Game controller GC uses the vibration to notify the user of a command from the game machine body. It is to be noted that although not illustrated in the drawings, game controller GC includes, for example, an inputting operation part for a game machine body in addition to the command notification function.

Mobile terminal M is, for example, a mobile communication terminal such as a mobile phone and a smartphone. Mobile terminal M uses the vibration to notify the user of incoming calls from external communication apparatuses, and achieves each function (for example, function of giving a sense of control and realism) of mobile terminal M.

As illustrated in FIG. 16 and FIG. 17, each of game controller GC and mobile terminal M includes communication unit 201, processing unit 202, drive control unit 203, and vibration actuators 10B, 10C and 10D serving as vibration actuator 10 serving as a driving part. It is to be noted that in game controller GC, a plurality of vibration actuators 10B and 10C are mounted.

In game controller GC and mobile terminal M, vibration actuators 10B, 10C and 10D are mounted such that the main surface of the terminal and the surface orthogonal to the vibration direction of vibration actuators 10B, 10C and 10D, or in this case, the bottom surface of lower case 56 are parallel to each other, for example. The main surface of the terminal is the surface that makes contact with the body surface of the user, and in the present embodiment, the main surface of the terminal means a transmission surface that transmits the vibration by making contact with the body surface of the user.

To be more specific, in game controller GC, vibration actuators 10B and 10C are mounted such that the vibration direction is orthogonal to the surface where the fingertips, belly of the fingers, and equality of the hands of the operating user come into contact, or the surface where the operation part is provided. In addition, in mobile terminal M, vibration actuator 10D is mounted such that the display screen (touch panel surface) and the vibration direction are orthogonal to each other. With this configuration, the vibration in the direction perpendicular to the main surfaces of game controller GC and mobile terminal M is transmitted to the user.

Communication unit 201, which is connected to an external communication apparatus through wireless communication, receives a signal from the communication apparatus and outputs it to processing unit 202. For game controller GC, the external communication apparatus is a game machine body serving as an information communication terminal, and communication is performed in accordance with a near field wireless communication standard such as Bluetooth (registered trademark). For mobile terminal M, the external communication apparatus is a base station, and communication is performed in accordance with a mobile communication standard, for example.

Processing unit 202 uses a conversion circuit part (omitted in the drawing) to convert an input signal into a drive signal for driving vibration actuators 10B, 10C and 10D, and outputs it to drive control unit 203. It is to be noted that in mobile terminal M, processing unit 202 generates a drive signal based on a signal input from various functional parts (not illustrated, such as an operation part such as a touch panel) in addition to a signal input from communication unit 201.

Drive control unit 203 are connected to vibration actuators 10B, 10C and 10D, and a circuit for driving vibration actuators 10B, 10C and 10D is mounted therein. Drive control unit 203 supplies a drive signal to vibration actuators 10B, 10C and 10D.

Vibration actuators 10B, 10C and 10D are driven in accordance with a drive signal from drive control unit 203. To be more specific, in vibration actuators 10B, 10C and 10D, movable body 20 vibrates in a direction orthogonal to the main surfaces of game controller GC and mobile terminal M.

Movable body 20 may make contact with bottom portion 541 of upper case 54 or bottom portion 561 of lower case 56 with a damper therebetween each time when movable body 20 vibrates. In this case, the impact of the vibration of movable body 20 on bottom portion 541 of upper case 54 or bottom portion 561 of lower case 56, that is, the impact on the housing, is directly transmitted as vibration to the user. In particular, in game controller GC, with a plurality of vibration actuators 10B and 10C, one or both of vibration actuators 10B and 10C can be simultaneously driven in accordance with the input drive signal.

A vibration is transmitted to the body surface of the user that makes contact with game controller GC or mobile terminal M in the direction perpendicular to the body surface, and thus a sufficient sensory vibration can be given to the user. Game controller GC can give the sensory vibration for to the user using one or both of vibration actuators 10B and 10C, and thus can give a highly expressive vibration such as strong and weak vibrations that are selectively applied.

The invention made by the inventor has been described in detail above based on the form of implementation. However, the invention is not limited to the above form of implementation, and can be changed within the scope not deviating from the gist thereof.

In addition, for example, vibration actuators 10 and 10A according to the embodiment of the present invention is suitably applicable to a mobile apparatus (for example, a mobile information terminal such as a tablet PC, a mobile game terminal, and a wearable terminal worn by the user) other than game controller GC and mobile terminal M illustrated in the embodiment. In addition, vibration actuators 10 and 10A according to the embodiment of the present invention may be used as an exciter as a vibration device that outputs a sound using vibration. An exciter, for example, is a vibrating speaker that has the ability to produce sound by bringing the vibrating surface into contact with an object without using a cone. In addition, vibration actuators 10 and 10A according to the embodiment of the present invention may be an exciter that cancels out and reduces external noise, such as road noise, by emitting sound. In addition, vibration actuators 10 and 10A according to the embodiment of the present invention may be used as a vibration generator. In addition to vibration actuators 10 and 10A of the present embodiment may also be used in electric beauty and hair care devices such as facial massagers that require vibration.

This application is entitled to and claims the benefit of Japanese Patent Application No. 2018-159790 filed on Aug. 28, 2018, the disclosure each of which including the specification, drawings and abstract is incorporated herein by reference in its entirety.

INDUSTRIAL APPLICABILITY

The vibration actuators of the embodiment of the present invention have shock resistance and can output suitable sensory vibrations, and are useful for use in electronic devices such as game machine terminals that provide vibrations to users, exciters serving as vibration devices that emit sound, or mobile terminals.

REFERENCE SIGNS LIST

10, 10A, 10B, 10C, 10D Vibration actuator
20, 20A Movable body
20a Outer peripheral surface
22, 22A, 24, 24A Spring stopper
30 Magnet
30a Surface
30b Rear surface
41, 42 Movable body core (Yoke)
50, 50A Fixing body
52, 52A Coil holding part
54 Upper case
56 Lower case
58 Electromagnetic shield part
61, 62 Coil
72, 72A Attenuation part
73 Attaching portion
81, 82 Elastic support part
201 Communication unit
202 Processing unit
203 Drive control unit
226, 246 Spring fixing part
522a Inner peripheral surface

522 Inner body part (Coil protection wall part)
522A Coil attaching portion
524 Outer body part
526 Center annular part
541, 561 Bottom portion
542, 562 Peripheral wall part
722 Flange
724 Rib (Pushing part)
802 Inner periphery part
804 Deformation arm
806 Outer periphery part

What is claimed is:

1. A vibration actuator comprising:
a movable body which comprises a stack formed by a magnet, a pair of magnetic cores and a pair of non-magnetic weights, is supported at both upper and lower sides of the movable body by a pair of leaf springs made of a magnetic material connected respectively to the pair of non-magnetic weights, and is operable to move vertically inside of a coil of a fixing body, wherein
the fixing body further comprises a magnetic cylindrical body which is disposed outside of the coil, and has a length, the length being longer than a distance between upper and lower ends of the pair of magnetic cores and shorter than a distance between the ends on the magnetic core side of the pair of leaf springs,
each of leaf springs comprises: an inner periphery part having a smaller diameter; an outer periphery part having a larger diameter; and a deformation arm being elastically deformable and having an inner end connected to the inner periphery part and an outer end connected to the outer periphery part, and
the outer periphery part is joined to the fixing body and the inner periphery part is joined to the movable body.

2. The vibration actuator according to claim 1,
wherein each of the non-magnetic weights comprises: a weight main body having a cylindrical shape; and a spring fixing part which protrudes vertically from the weight main body and in which a step is formed with respect to the weight main body.

3. An electronic apparatus comprising the vibration actuator according to claim 1.

4. The vibration actuator according to claim 2,
wherein a vertical length including a vertical length of the weight main body and a vertical length of the spring fixing part is longer than a vertical length of one of the magnetic cores.

* * * * *